US012624928B2

(12) United States Patent
Gamache et al.

(10) Patent No.: US 12,624,928 B2
(45) Date of Patent: May 12, 2026

(54) EXPLOSIVELY FORMED ACTIVE WATER BARRIER RPG PROTECTION SYSTEM AND METHOD FOR MARITIME VESSELS

(71) Applicant: THE UNITED STATES OF AMERICA, AS REPRESENTED BY THE SECRETARY OF THE NAVY, Arlington, VA (US)

(72) Inventors: Raymond Gamache, Salinas, CA (US); William G. Szymczak, Gaithersburg, MD (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 683 days.

(21) Appl. No.: 18/093,753

(22) Filed: Jan. 5, 2023

(65) Prior Publication Data

US 2023/0211861 A1     Jul. 6, 2023

Related U.S. Application Data

(60) Provisional application No. 63/296,847, filed on Jan. 5, 2022.

(51) Int. Cl.
*F41H 11/02*         (2006.01)
*B63G 1/00*          (2006.01)
(Continued)
(52) U.S. Cl.
CPC .............. *F41H 11/02* (2013.01); *G01S 13/72* (2013.01); *G01S 13/726* (2013.01); (Continued)

(58) Field of Classification Search
CPC ... B63G 9/02; B63G 1/00; B63G 3/04; B63G 7/02; B63G 13/00; B63G 9/00;
(Continued)

(56) References Cited

U.S. PATENT DOCUMENTS 3,867,893  A  *  2/1975  Saholt ..................... F42B 15/36
                                                    244/3.25
4,215,630  A  *  8/1980  Hagelberg ............... B63G 9/02
                                                    89/36.17
(Continued)

FOREIGN PATENT DOCUMENTS

DE      102015002737 A1  *  9/2016  .............. F41H 11/02
EP          0126244 A2  *  11/1984  .............. F41H 11/02
RU          2348890 C2  *  3/2009

OTHER PUBLICATIONS

DE-102015002737-A1 Machine Translation Copy (Year: 2016).*
(Continued)

*Primary Examiner* — Marc Q Jimenez
*Assistant Examiner* — Eric Anthony Starck
(74) *Attorney, Agent, or Firm* — Heber Martin Carbajal; Scott Bell

(57)         ABSTRACT

Disclosed is a method and system to provide protection for maritime vessels from multiple threat types including shoulder launched rocket propelled threats, ballistic (howitzer), and larger scale missile systems. According to an exemplary embodiment, the protection system is based on the ballistic launch (from the protected vessel) of an explosive charge(s) aimed ~5 meters away from the vessel and ~1 meter beneath the waterline followed by detonation to enable the formation of a water wall. Through the formation of a water wall, incident threats can be initiated (piezo fuze) and passivated through dynamic interaction with the water formation. In addition, the upward velocity of the water wall can enable an
(Continued)

upwards rotation of the incident threat changing the orientation of the warhead jet formation (for shape charge warheads) above the vessel.

12 Claims, 19 Drawing Sheets

(51) Int. Cl.

| | |
|---|---|
| *B63G 9/02* | (2006.01) |
| *G01S 13/72* | (2006.01) |
| *G01S 13/86* | (2006.01) |
| *G01S 13/88* | (2006.01) |
| *G01S 17/88* | (2006.01) |

(52) U.S. Cl.
CPC ............ *G01S 13/867* (2013.01); *G01S 13/88* (2013.01); *B63G 1/00* (2013.01); *B63G 9/02* (2013.01); *G01S 17/88* (2013.01)

(58) Field of Classification Search
CPC ........ F41H 11/02; F41H 5/007; G01S 13/726; G01S 17/88; G01S 13/72; G01S 13/867; G01S 13/88; F41F 1/00; F41F 3/00; F41G 5/20; F42B 21/00; F42B 15/22
USPC ............ 114/1, 3, 4, 5, 7; 505/164; 89/36.01, 89/36.12, 1.11
See application file for complete search history.

(56) References Cited

U.S. PATENT DOCUMENTS

| | | | | | |
|---|---|---|---|---|---|
| 5,317,319 | A | * | 5/1994 | Fagarasan | ............... G01S 13/86 342/195 |
| 5,400,688 | A | * | 3/1995 | Eninger | ................. F41H 11/02 89/36.12 |
| 8,740,071 | B1 | * | 6/2014 | Higgs | ..................... F41H 5/007 235/413 |
| 2005/0001755 | A1 | * | 1/2005 | Steadman | ............... G01S 13/86 342/14 |
| 2005/0116853 | A1 | * | 6/2005 | Bredy | ....................... F41G 5/08 342/52 |
| 2008/0018519 | A1 | * | 1/2008 | Berg | .................. F41H 13/0068 342/67 |

OTHER PUBLICATIONS

EP-0126244-A2 Machine Translation Copy (Year: 1984).*
RU-2348890-C2 Machine Translation Copy (Year: 2009).*
Szymcyzak et al. Water Barrier Predictions for Riverine Vessel Defense, NDIA 2014 Warheads & Ballistics Symposium on Aug. 4-7, 2014, [online], [web page creation date Feb. 2, 2015]. Retrieved from the Internet <URL: https://apps.dtic.mil/sti/html/tr/ADA612346/ >. (Year: 2015).*
Passive infrared sensor [online]. Wikipedia [archived on Dec. 12, 2021]. Retrieved from the Internet: <URL: https://web.archive.org/web/20211212075830/https://en.wikipedia.org/wiki/Passive_infrared_sensor>. (Year: 2021).*
W.G. Szymczak, J.C.W. Rogers, J.M. Solomon, and A.E. Berger, "A Numerical Algorithm for Hydrodynamic Free Boundary Problems," J. Comp. Phys. 106, 319-336, 1993.
W.G. Szymczak and J.M. Solomon, "Computations and Experiments of Shallow Depth Explo•sion Plumes," NSWCDD/TR-94/156, Naval Surface Warfare Center, Dahlgren Division, Dahlgren, Va., 1996.
L. Lipton, "Probe Measurement of Water Mass of Plumes Produced by Underwater Detona•tions," IHTR 1757, Naval Surface Warfare Center, Indian Head Division, Indian Head, Md., 1995.
W.G. Szymczak and C.E. Higdon, "Model Validations and Predictions for Water Barrier De•fense," NRL/FR/7130—98-9880, Naval Research Laboratory, Washington, DC, 1998.

* cited by examiner

EXPLOSIVELY FORMED ACTIVE WATER BARRIER RPG PROTECTION SYSTEM AND METHOD FOR MARITIME VESSELS

CROSS REFERENCE TO RELATED PATENT(S) AND APPLICATION(S)

This application claims the benefit of U.S. Provisional Application No. 63/296,847, filed Jan. 5, 2022, and entitled Explosively Formed Water Barrier RPG Protection for Maritime Vessels, which is hereby incorporated in its entirety by reference.

BACKGROUND

This disclosure, and the exemplary embodiments described herein, describe methods and systems for explosively actively formed water barrier RPG (rocket-propelled grenade) protection system and method for maritime vessels. The implementation described herein is related to a systems and methods for implementation in a maritime vessel, however it is to be understood that the scope of this disclosure is not limited to such application.

INCORPORATION BY REFERENCE

The following publications are incorporated by reference in their entirety.

[Ref. 1] R. Gamache, F. Albert, and J. Blair, "Riverine Active & Passive Rocket Propelled Grenade Defense Study," Naval Surface Warfare Center, Dahlgren Division, Dahlgren VA, 29 Oct. 2013.

[Ref. 2] C. E. Higdon, "Water Barrier Ship Self-Defense Concept," NSWCDD/MP-94/94, Naval Surface Warfare Center, Dahlgren Division, Dahlgren, Va., 1994, pp. 140-153.

[Ref. 3] J. G. Connor and C. E. Higdon, "Water Barrier Line Charge Plume Video Analysis," NSCWDD/TR-96/178, Naval Surface Warfare Center, Dahlgren Division, Dahlgren, Va., 1996.

[Ref. 4] J. T. Choe, K. A. Boulais, K. A. Chun, and K. A. Irwin, "Microwave Probe for Mass Measurements of a Water Plume," NSWCDD/TR-95/187, Naval Surface Warfare Center, Dahlgren Division, Dahlgren, Va., 1995.

[Ref. 5] L. Lipton, "Probe Measurement of Water Mass of Plumes Produced by Underwater Detonations," IHTR 1757, Naval Surface Warfare Center, Indian Head Division, Indian Head, Md., 1995.

[Ref. 6] C. E. Higdon, W. G. Szymczak, and J. G. Conner "Analysis of Water Barrier Line Charge Plume Measurements," NSWCDD/TR-97/210, Naval Surface Warfare Center, Dahlgren Division, Dahlgren, Va., 1998.

[Ref. 7] W. G. Szymczak and J. M. Solomon, "Computations and Experiments of Shallow Depth Explosion Plumes," NSWCDD/TR-94/156, Naval Surface Warfare Center, Dahlgren Division, Dahlgren, Va., 1996.

[Ref. 8] W. G. Szymczak and C. E. Higdon, "Model Validations and Predictions for Water Barrier Defense," NRL/FR/7130-98-9880, Naval Research Laboratory, Washington, DC, 1998.

[Ref. 9] R. H. Cole, Underwater Explosions (Princeton University Press, Princeton, N.J., 1948) Ch. 8, pp. 270-353.

[Ref. 10] W. G. Szymczak, J. C. W. Rogers, J. M. Solomon, and A. E. Berger, "A Numerical Algorithm for Hydrodynamic Free Boundary Problems," J. Comp. Phys. 106, 319-336 (1993).

[Ref. 11] J. C. W. Rogers and W. G. Szymczak, "Computations of Violent Surface Motions: Comparisons with Theory and Experiment," Phil. Trans. R. Soc. Lond. 355(A), 649-663 (1997).

[Ref. 12] Szymczak, W. G., Zien, T. F., Hsieh, T. and Pham, K., "BUB3D-RB Formulation Guide," NRL/FR/7130-05-10130, November, 2006.

[Ref. 13] W. G. Szymczak, S. L. Means, and J. C. W. Rogers, "Computations of bubble formations and pulsations generated by impacting cylindrical water jets," Journal of Engineering Mathematics, 48, 375-389, (2004)

[Ref. 14] H. G. Snay, J. F. Goertner, and R. S. Price, "Small Scale Experiments to Determine Migration of Explosion Gas Globes Towards Submarines," NAVORD Report 2280, Naval Ordnance Laboratory, Silver Spring, Md., 1952.

[Ref. 15] M. J. Swisdak, Jr., "Explosion Effects and Properties: Part II—Explosion Effects in Water," NSWC/WOL TR 76-116, Naval Surface Weapons Center, White Oak Laboratory, Silver Spring, Md., 1978.

[Ref. 16] V. K. Kedrinskii, "Surface Effects from an Underwater Explosion (Review)," J. of Appl. Mech. and Tech. Phys. 19(4), 474-491 (1979).

[Ref. 17] J. R. Blake, B. B. Taib, and G. Doherty, "Transient Cavities near Boundaries. Part 1. Rigid Boundary," J. Fluid Mech. 170, 479-497 (1986).

[Ref. 18] G. A. Young, "Dispersion of the Chemical Products of Underwater Explosions," NSWC TR 82-404, Naval Surface Weapons Center, Dahlgren, Va., December, 1984.

[Ref. 19] W. L. Fourney, D. J. Goodings, R. J. Bonenberger, and H. U. Leiste, "Visualization of Cratering in an Underwater Environment," FRAGBLAST: The International Journal of Blasting and Fragmentation, 6, (1), 1-20, (2002).

[Ref. 20] DYSMAS User's Manual, NSWC Indian Head Division, Indian Head, MD, DYSMAS Verison 6.5.03, 30 Apr. 2013.

[Ref. 21] A. Wardlaw and R. Ilamni, "Simulation of Underwater Explosion Cavitation Phenomena," NSWC Indian Head Division, Indian Head, MD, IHTR 2589, May 28, 2004.

BRIEF DESCRIPTION

In accordance with one embodiment of the present disclosure, disclosed is a system for an active defense system operatively associated with a maritime vessel, the active defense system detecting a target projectile, and in response to the detected target projectile, creating a water barrier proximately located near the target projectile, the active defense system comprising: a launcher to launch an explosive countermeasure into water within the line of flight of a target projectile; an IR detection device to detect an incident target projectile; and a cued radar to provide tracking of the target projectile enabling mission planning for initiation of the launcher, wherein the explosive countermeasure detonates at a target distance from the maritime vessel and at a target depth, and the detonation creates a water barrier that initiates and absorbs the shape charge jet from the target projectile.

In accordance with another embodiment of the present disclosure, disclosed is a an active defense method operatively associated with a maritime vessel, the active defense method detecting a target projectile, and in response to the detected target projectile, creating a water barrier proximately located near the target projectile, the active defense method comprising: a launcher launching an explosive countermeasure into water within the line of flight of a target projectile; an IR detection device detecting the target projectile; and a cued radar enabling tracking of the target projectile to a targeting system enabling mission planning for initiation of the launcher, wherein the explosive countermeasure detonates at a target distance from the maritime vessel and at a target depth, and the detonation creates a water barrier that initiates and absorbs the shape charge jet from the target projectile.

BRIEF DESCRIPTION OF THE DRAWINGS

For a more complete understanding of the present disclosure, reference is now made to the following descriptions taken in conjunction with the accompanying drawings.

DETAILED DESCRIPTION

Figure 1:
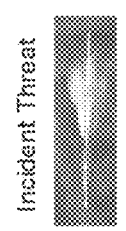
FIG. 1 shows an active defense system, operatively associated with a maritime vessel, according to an exemplary embodiment of this disclosure.
Figure 1:
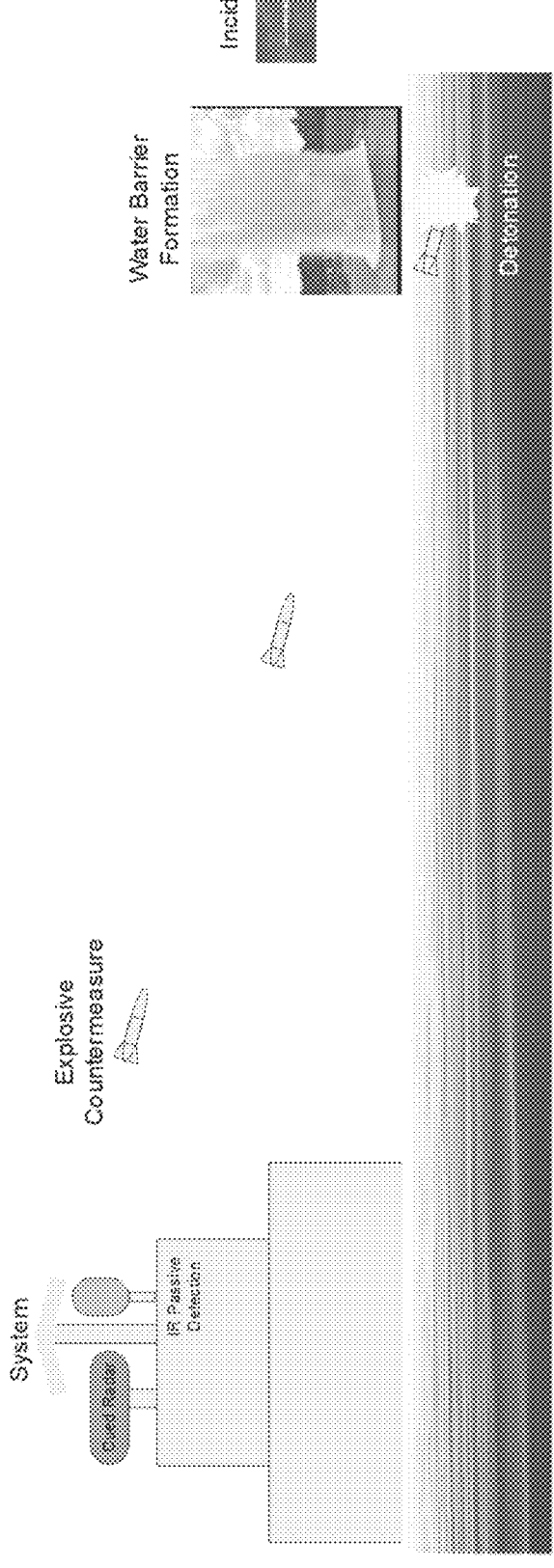

This disclosure and exemplary embodiments described herein provide an active defense system operatively associated with a maritime vessel, the active defense system detecting a target projectile, and in response to the detected target projectile, creating a water barrier proximately located near the target projectile.

In addition to an exemplary method and system, a study is presented showing results of predictions of the amount of water ejected from shallow depth explosions. Measurements of the Equivalent Water Length (EWL) are determined by integrating the density along a horizontal line through the plume. These EWL values are important for the assessment of the viability of using plumes as an effective water barrier for vessel defense. The predictions are obtained using a model based on a generalized formulation of hydrodynamics using an incompressible liquid assumption. This formulation is well suited for predicting long-time bubble and plume dynamics and has been previously validated on a variety of applications including water plume predictions. The purpose of this study is to obtain estimates for EWL values at specified heights, the time length that these levels persist during the plume evolution, as well as estimates for the effects of charge depth and size.

The description below provides exemplary embodiments of the present disclosure. The scope of the present disclosure is not limited by these exemplary embodiments. Numerous variations, whether explicitly provided for by the specification or implied by the specification or not, may be implemented by one of skill in the art in view of this disclosure.

A typical weapon control system comprises a Search radar, Track radar and a Weapon (gun or a missile) system. For example, search radar may be a rectangular antenna, tracking radar with the parabolic antenna and a gun mount. The rectangular search radar antenna moves in a 360 degree rotation covering complete 360 degree in bearing and a limited amount of elevation based on its elevation beam width. The parabolic track antenna moves with the target direction, there by tracking the target.

Search radar searches for potential threat targets, by an all-round search in bearing and in the given elevation sector with the search antenna. On identifying a threat, the search radar gives a cue of the target, which is basically the instantaneous position of the target in terms of the target range, bearing, elevation, speed and probable target type. The tracking radar based on this cue, moves to the position of the target with its track antenna and tracks the target continuously giving a precise update of the target. Tracking radar now gives a cue to the Gun/Missile system, basically the track data, by which the gun/missile system aims at the target and brings it down.

This disclosure was prepared in support of the "RPG Water barrier Concept" as described in [Ref. 1]. The concept uses a "wall of water" to provide a defense mechanism for the protection of riverine vessels against an attack from e.g. a rocket propelled grenade (RPG) attack. The "wall of water" or "water barrier" is formed from the shallow detonations of a single or multiple underwater explosives. This concept can be employed to detonate or erode incident shape charge threats. We remark that a similar concept was considered in the mid to late 1990s for ship defense against sea-skimming missiles in [Ref. 2] together with supporting experiments [Ref. 3-5] and predictions [Refs. 7 and 8].

The disclosed method and systems provide protection for maritime vessels from multiple threat types including shoulder launched rocket propelled threats, ballistic (howitzer), and larger scale missile systems. The protection system is based on the ballistic launch (from the protected vessel) of an explosive charge(s) aimed ~5 meters away from the vessel and ~1 meter beneath the waterline followed by detonation to enable the formation of a water wall. Through the formation of a water wall, incident threats can be initiated (piezo fuze), and passivated (deceleration of kinetic threats [including shape charge jets]) through dynamic interaction with the water formation. In addition, the upward velocity of the water wall can enable an upwards rotation of the incident threat changing the orientation of the warhead jet formation (for shape charge warheads) above the vessel.

As shown in FIG. 1, an exemplary active defense system, as provided herein, includes a water barrier active protection system, as disclosed herein. Within this system, an IR (detecting threat launch) is used to cue the radar system for trajectory tracking. The initial trajectory is processed within MAPS to develop an intercept solution. Fixed positioned launch tubes will enable on command launching of the countermeasure projectiles to enable the water wall formation to intercept the incident threat.

There are many benefits related to the application of a water barrier to defeat incident threats previously mentioned. Within active protection systems, the water barrier enables a larger dwell time in which the water wall formed maintains physical dimensions capable of defeating the incident threat. The larger dwell time enables both a higher probability of the water wall to intercept the incident threat as well as a reduction in the performance requirements within the kill chain instrumentation (sensors/engagement). This reduction in performance requirements will enable integration of lower cost system components while maintaining a high probability of defeat. In addition, inclusion of multiple energetic charges, within a salvo, will increase lateral profile of the water wall and reduce angular accuracy requirements.

A second benefit, within the application of a water wall system, is the removal of secondary fragmentation within energetic threats. Ground vehicle protection systems (both passive and active) typically require a minimum personal protection of ⅜" rolled homogeneous armor (RHA) to address secondary fragmentation due to indirect initiation of threat energetics. Without secondary fragmentation protection larger casualties, during engagement, will occur. Many maritime vessels do not incorporate armor systems enabling secondary fragmentation protection due to buoyancy and agility requirements. Through the water wall formation, both the primary and secondary threat mechanisms are passivated.

The disclosed water barrier system can be broken down into the following key components: Detection (IR/radar), Solution (engagement planning), and Engagement (launch tube and projectile). Detection includes integration of IR with radar to enable both cueing of an event and threat tracking. Engagement solutions will incorporate Modular Active Protection System (MAPS) enabling integration of threat tracking, determination of engagement solution and command/control of engagement system. The engagement system will incorporate all aspects of engagement including launcher tubes, projectile system/design (supercavitating), energetics and fuze system.

Phase I

Previous efforts were performed through modeling using 3DBUB (a software developed at NRL and output results anchored to experimentally tested explosively formed water walls). An explosive test series to correlate water wall formations, with both charge weight and charge depth, can be performed to verify and anchor code to this specific application. Explosive charge weights, using selected energetic (PBXN-111) formed into right circular cylinders (RCC) from 1-3 lbs (explosive weight will vary based on sponsor-defined threat) will be statically placed at specific depths below the water line.

Two high-speed cameras, located 90 degrees apart, and backdrops will enable determination of physical dimensions of the water wall formation as a function of time. A repeat test series using a salvo scenario incorporating three charges of the selected charge weight and depth configuration will be performed for a total of 18 shots (charge separation will be determined using 3DBUB). In addition, a water depth study incorporating a water depth of two meters will additionally be tested for a total number of 36 tests. All data will be incorporated within 3DBUB to further anchor the computational modeling.

Following the explosive water formation tests, for each charge configuration, a selected shape charge warhead (possibly RPG-7) will be statically detonated at a specific time delay relative to the detonation time of the underwater explosion. Within this component of the test series, in addition to the water formation, the residual lethality of the shape charge warhead, post engagement to the water barrier, will be studied. Two witness panels (0.020" Al 2024 (secondary fragmentation witness panel) and a series of qty 6×½" thickness RHA plates (2'×2' areal dimensions)) will be incorporated to assess the remaining lethality of the shape charge warhead. The 0.020" 2024 Al panel is the traditional witness material used to define complete penetration for opaque armor V-50 studies.

Phase II

Within phase II testing, ballistic tests will be studied for both hemispherical and supercavitating nose configurations related to flight characteristics. Testing will incorporate projectiles representative of both 2 and 3 lb charge weights with the two different nose configurations. No energetics will be incorporated within this test series. Variables, in addition to projectile characteristics, will include muzzle velocity, range (angle of attack), and depth to detonation.

A reusable 3D accelerometer system integrated with an inflight recorder will be used to track the kinematic motion during flight. The accelerometer data will serve two purposes, the first will enable timing and kinetic data including both in-flight and water terminal ballistics. Here the accelerometer will enable time durations as well as projectile stability under the four different flight conditions (launch tube/atmosphere, atmosphere, atmosphere/water, and water). In addition, the impedance and Bernoulli forces (Poncelets eqn) can be measured. The impact and propagation pressures can be extracted and support fuzing parameters. The anticipated design will most likely incorporate a supercavtating nose as both velocity loss and terminal flight attitude variations are considered minimal (less than 10% variation).

Phase III

Within all of the static warhead tests performed (Phase I), the rocket motors will be removed and a detonator/booster is used to initiate the warhead. The rocket component will be used with an inert warhead (identical shape, mass, and density distribution) to perform both detection/tracking of the selected threat. Within this configuration detection instrumentation (IR/Radar) interfacing with MAPS will be used to determine both detection/tracking performance as well as engagement solutions.

Within the dynamic test series 18 shots can be studied within range separations from 50 to 200 meters (accuracy drops to 50% at 200 meters for RPG-7). Within this test phase, the ability to detect and track the projectile during flight can be determined.

All tests will include measured timing responses determined within Phase I and II water barrier and projectile flight. Based on known launch location and theoretical flight characteristics a predetermined engagement calculation (angular location and engagement timing) will be compared to MAPS output. Corrections to sensor performance and trajectory calculations will be performed within Phase III to enable accurate trajectory measurements and engagement solutions.

Phase IV

Phase IV is the final effort incorporating all aspects of engagement (except fuzing). A total of three different engagements distances will be performed including 60, 100 and 200 meter standoff. Within each of the three engagement distances, two tests will be performed at each standoff distance. All tests will be designed to represent a realistic scenario within a calm sea state condition.

Based on an identified vessel, a mockup of the vessel can be constructed and incident threats will be aimed at the port or starboard side of the vessel. All instrumentation will be placed onboard and all engagement operations will be performed autonomously. Engagement sequencing will incorporate IR detection and radar tracking. A known flight table (threat velocity vs. time) will be pre-loaded into MAPS but threat determination will be performed based on IR signature and initial flight data.

In addition, engagement solutions will assess the engagement window timing to adjust engagements between the initial wall formation and the larger secondary wall formation. All engagements will attempt to correlate the upwards motion of the water wall with the initial contact of the water wall and the incident threat (enable upwards rotation of the incident threat).

To represent a realistic representation of the launcher/projectile, two projectiles will be used within this engagement. The first round will include the required energetics and will incorporate a detonator/booster controlled by MAPS. This round will be placed at the specific location and orientation as if it was launched from the vessel. In parallel, an inert round will be launched from the launcher with an onboard 3D accelerometer. The launched projectile will have a trajectory 180 degrees from the interception position where the water wall will be formed. The second projectile trajectory will be assessed based on accelerometer data. Timing, from launch, can be directly correlated to MAPS control based on the initial acceleration pulse from firing. Velocity and deceleration data of the projectile flight can be measured and verified through both the accelerometer data and application of trajectory analysis using Track Eye Motion Analysis (TEMA) within high-speed video. Through the use of two projectiles all aspects of system performance (MAPS engagement) and projectile performance can be assessed with the only remaining variable fuze timing which will most likely not be determined.

High-speed video in both front and side views will be incorporated to assess both the water wall formation as well as the timing relative to the threat engagement. Water wall physical dimensions at the engagement locations will be determined. A similar 0.020" 2024 Al witness panel (4'×8') will be used to determine if any secondary fragmentation has reached the vessel. A single larger (4'×4') areal dimension RHA panel ½" thickness will be incorporated to investigate any residual jet material.

Phase IV will enable a 95% verification (missing fuze performance) of the end to end performance of the water barrier system for three different engagement locations. Based on performance assessment, within phase IV, the minimum standoff distance can be accurately determined. In addition, an initial reliability performance will be determined through the response times and interface reliability for detection and tracking.

Described below are further details related to the study and implementation of Explosively Formed Water Barrier RPG Protection Systems and Methods for Maritime Vessel as disclosed herein.

Explosion Dynamics

Upon detonation of an underwater explosive (see e.g. [Ref. 9]) a shock wave moving away from the charge is emitted. This wave reflects off the surface as a rarefaction wave which travels back down through the gas globe of detonation products. Due to the tension created behind the rarefaction wave, a whitened area of cavitation is formed that rises from the surface. Under the surface a bubble is formed from the combustion products, which expands rapidly due to the initially high pressures of its internal gases. The early expansion of the bubble is nearly spherical, after which a water plume forms above the bubble. Eventually, the bubble expands to its maximum volume. If this maximum volume has an equivalent spherical radius that is between approximately one and two times the initial charge depth, a second jet moving downward through the bubble will form during its collapse to a minimum volume. The duration from the time of the detonation to the first collapse is referred to as the "bubble period." Since the jet strikes the bottom of the bubble before the minimum volume is attained, the bubble forms an annular region. As the annular bubble re-expands, secondary plumes are ejected radially, surrounding the central initial plume. The existence of these radial plumes has been observed experimentally and was first predicted computationally in [Ref. 7] and [Ref. 8].

In the case of very shallow explosions where the equivalent maximum radius of the bubble is five times larger than the charge depth, the bubble will open up into a expanding cavity with its gas escaping into the air. In this case the rebound of the cavity will send a large amount of water to heights of several bubble radii, albeit at a much later time than the bubble period in free water.

In the case of a line charge or several point charges placed sufficiently close together, a cylindrical bubble is formed. The initial plume forms a wall of water above the line of charges. Secondary plumes erupt on either side of the central plume after the first bubble collapse. Studies of line charges for plume creation were studied in [Ref. 6] and [Ref. 8] and may be re-considered in later phases of this study.

The shock related phenomena described above typically occurs on the order of a millisecond or less. For the examples discussed in this report, bubble periods are approximately 0.3 s with secondary plumes erupting shortly afterward. The entire duration, from the detonation to the plume falling back down to the water surface, usually lasts between 4 and 6 seconds.

Model Approach

The computer codes used for the simulations and modeling presented in this report are based on a generalized formulation of hydrodynamics [Refs. 8 and 10-11]. This method is well suited for the study of shallow-depth explosion plumes for the following reasons:

1) The "water" or "liquid" region is modeled as incompressible, thereby allowing for time steps proportional to the inverse of the water velocity as opposed to the much smaller time steps that a compressible formulation would require based on the speed of sound in water. This is important because plume behavior occurs on the order of seconds.

2) The model allows for regions of "spray," which is typical of plume behavior in which a well defined interface between the bubble and water or especially the water and the air does not exist.

3) The computational model uses a fixed "Eulerian" grid providing for generality in studying complex bubble dynamics and free surface topology changes. For shallow-depth explosions this includes the underwater bubble forming one or more annular regions as a downward moving jet intersects the bottom surface of the bubble as it collapses, in addition to the radial plumes ejected on the bubble's second expansion, and the eventual venting of the bubble into the atmosphere.

The generalized formulation considers the solution of the mass and momentum conservation with constraints on density and pressure. The density constraint, together with the conservation of mass equation, are equivalent to the usual divergence free constraint for incompressible flow in regions where the density is at its maximum (liquid) value. A constraint on the pressure can be imposed for cavitation predictions but is not considered for this application. The constrained equations are solved numerically using a split step procedure. First, the conservation equations are approximated without regard to the constraints using a second order Godunov Method with monotonized slope limiting. Next, the density constraint is imposed through the solution of a variational inequality, which becomes a linear complementarity problem upon discretization. Finally, the pressure is determined using a projection method discretized using a finite element method. This algorithm has been implemented for both a two-dimensional (2-D) (or axially symmetric) code BUB2D [Refs. 10 and 11], and a three-dimensional (3-D) code in generalized coordinates BUB3D [Ref. 12]. However, only axially symmetric results will be presented here.

Comparisons of the computational results using different size grids will be presented to address the issue of numerical discretization error. A verification of the model on a spherically symmetric bubble produced with the same charge and grid resolution is performed in order to access the expected error in maximum bubble radius and period of oscillation. This model has also been validated on shallow plumes predictions in [Refs. 7-8 and 11]. A comparison of the bubble and plume outlines for both spark-induced and explosion bubbles was included in [Ref. 7] and [Ref. 11]. Comparisons to measured plume heights and to microwave measurements of the amount of water thrown upward by the plumes are shown in both [Ref. 7] and [Ref. 8]. Reference [Ref. 13] includes validations of shallow bubbles and cavities produced by impacting liquid cylinders.

The Computational Model

Model Equations

A brief summary of the model formulation and some computational details are presented here for the sake of completeness and for an understanding of the input parameters used for the predictions. This formulation uses a fixed spatial domain $\Omega$, where the density $\rho$, velocity $u$, and the pressure p are governed by the mass and momentum conservation equations $$\rho_t + \nabla \cdot (\rho u) = 0 \tag{1}$$

$$(\rho u)_t + \nabla \cdot (\rho u u) = -\rho g k - \nabla p \tag{2}$$

subject to the constraint $$\rho \le \rho_0, \tag{3}$$

where $\rho_0$ is the constant density of the incompressible liquid. In Eq. (2)—k is the unit vector in the direction of the gravitational force, and g is the gravitational constant. In regions where $\rho = \rho_0$, Eq. (1) becomes the usual divergence free condition for incompressible flow. We define the time varying "liquid" domain D(t) by $$D(t) = \{x : \rho(x, t) = \rho_0\}. \tag{4}$$

The non-liquid domain is defined using $$\Omega - D(t) = A(t) \cup B(t) \cup C(t), \tag{5}$$

where the regions A, B, and C are disjoint. Within these regions, the pressure is assumed to be uniform; that is $$p(x, t) = \begin{cases} p_A & x \in A(t) \\ p_B(t) & x \in B(t) \\ p_C & x \in C(t) \end{cases} \tag{6}$$

In the above, $p_A$ represents the constant ambient "air" pressure. The "bubble" pressure, $p_B(t)$, is usually determined using an adiabatic gas assumption $$p_B(t) = c(V_B(t))^\gamma; \tag{7}$$

where c is constant, $\gamma$ is the (constant) ratio of specific heats of the bubble gases, and $V_B(t)$ is the bubble volume, which can be determined using $$V_B(t) = \int_{B(t)} \left(1 - \frac{\rho(x, t)}{\rho_0}\right) dx. \tag{8}$$

Finally, $p_C$ is the "cavitation" pressure, which is usually set to the vapor pressure of the liquid at some specified temperature. When cavitation is to be modeled, an additional constraint is imposed on the pressure, namely that $p(x,t) \ge p_C$. For the results presented here, this constraint was not imposed, that is, $p_C = -\infty$.

Multiple Bubbles and Venting

In the computational space, the domain $\Omega$ is divided into discrete cells $C_I$. The constraint (3) is then implemented using $$\rho_I^n \ge (1 - \varepsilon_\rho)\rho_0, \tag{11}$$

where $$\rho_I^n$$

is the density in cell $C_I$ at some discrete time step $t = t^n$. For shallow-depth explosion bubbles, the choice of $\varepsilon_\rho$ is important. In general, small values of $\varepsilon_\rho$ will cause cells with only slightly less density than the liquid to be treated as regions with uniform pressure, while larger values will cause more of the "spray" (where $0 < \rho < \rho_0$) to be treated as a variable density incompressible region.

In addition to the distinction in the nonliquid regions designated by "air" A, "bubble" B, and "cavitation" C, each component (connected disjoint subset) of B is also accounted for. That is, at time t=$t^n$ the "bubble" may be decomposed as $$B^n = \bigcup_{k=1}^{K^n} B_k^n,$$

where $K^n$ is the number of distinct bubbles at time step n, and $$B_k^n$$

is the component corresponding to bubble k at time step n. When the bubble components $$B_k^n$$

remain distinct, their pressures $$p_k^n$$

behave adiabatically $$p_k^n = c_k(V_k^n)^\gamma,$$

where $$V_k^n$$

represents the volume of $$B_k^n,$$

and $c_k$ is constant for all steps n for which the component has no interactions. If a bubble component splits into two distinct regions, say, $$B_k^n \to B_l^{n+1} \cup B_m^{n+1},$$

the new pressures $$p_l^{n+1} \text{ and } p_m^{n+1}$$

are computed assuming the volume changes occurred before the split; that is,

12

$$p_l^{n+1} = p_m^{n+1} = \frac{p_k^n (V_k^n)^\gamma}{(V_l^{n+1} + V_m^{n+1})^\gamma}.$$

Similarly, if two distinct bubbles merge into a single component region, for $$B_l^n \cup B_m^n \to B_k^{n+1}$$

example, the new pressure is given by $$p_k^{n+1} = \frac{(p_l^n V_l^n + p_m^n V_m^n)(V_l^n + V_m^n)^{\gamma-1}}{(V_k^{n+1})^\gamma}.$$

These formulas have been extended to the general case treating any finite number of bubbles merging and splitting in [Ref. 6]. Whenever merging occurs, the pressure of the new component changes instantaneously. Similarly, when a bubble comes in contact with the air region (that is a cell in $$B_k^n$$

is adjacent to a cell in A), the bubble is said to "vent" into the air with the pressure instantaneously changing to the air pressure. This is obviously a crude approximation to the finite amount of time the venting would actually take or to the partial venting of the bubble. In particular, if the relatively thin layer of water between the bubble and air is under-resolved by the computational grid, the computed bubble may vent prematurely causing gross errors in the subsequently computed dynamics. In order to prevent this premature venting, the value of $\varepsilon_\rho$ in Eq. (11) is allowed to depend upon both time and space by the prescription $$\varepsilon_\rho = \varepsilon_l^n = \begin{cases} \varepsilon_A & C_l \in N(A^n) \\ \varepsilon_B & \text{otherwise} \end{cases}, \quad (12)$$

where $N(A^n)$ is the set of cells that are either in or adjacent to the time varying domain $A^n$.

Initial Conditions

For a single charge, the bubble is initialized as a spherical "void," with zero density, radius $A^0$, and pressure $$p_B^0 = p_B(0),$$

surrounded by a liquid region at rest. The initial values for the bubble radius and pressure depend on the hydrostatic pressure at the depth of the charge, the charge weight, and empirical constants which depend on the charge type, derived from considering the equation of motion of a spherical bubble in an infinite incompressible medium. In this case, the bubble remains spherical, and its radius oscillates periodically between its minimum, $A_{min}$ and maximum, values. $A_{max}$ Empirical Relations The following empirical relations are valid for shallow-depth underwater explosions (see [Ref. 7])

$$A_{min} = qW^{1/3} \tag{13}$$

$$P_\infty = D + p_A \tag{14}$$

$$G(\alpha) \equiv \frac{1}{\alpha}\left(\frac{1-\alpha^{3(1-\gamma)}}{1-\alpha^{-3\gamma}}\right)^{1/3} = \frac{q}{J_\infty}P_\infty^{1/3} \tag{15}$$

$$P_B^0 = P_\infty(1-\gamma)\left(\frac{1-\alpha^3}{1-\alpha^{3(1-\gamma)}}\right). \tag{16}$$

In the equations listed above, q is the empirical minimum radius constant, which depends on the charge type; W is the charge mass; d is the initial charge depth; and $p_A$ is the ambient air pressure. If d is measured in units of feet and $p_A$ in feet of water, then $P_\infty$ is the hydrostatic pressure at the charge depth in units of feet of water. In Eq. (15), $\gamma$ is the ratio of specific heats for the bubble gases, and $J_\infty$ is the empirical maximum radius constant. In the above equations, the value for a must be determined as the solution to Eq. (15) with a given value for the right-hand side. This can be done approximately using, for example, Newton's method. The value a is also the ratio of maximum to minimum bubble radii, $$\alpha = \frac{A_{max}}{A_{min}}, \tag{17}$$

so that $$A_{max} = J_\infty\left(\frac{1-\alpha^{3(1-\gamma)}}{1-\alpha^{-3\gamma}}\right)^{1/3}\frac{W^{1/3}}{P_\infty^{1/3}} \equiv J_\alpha\frac{W^{1/3}}{P_\infty^{1/3}}. \tag{18}$$

In cases when the depth ranges between 100 and 1000 ft, it was noted in Ref. 8 that values for $J_\alpha$ remain nearly constant. Because of this and the interest in the relatively deeper charge depths, subsequent reports (e.g., [Refs. 14 and 15]) used Eq. (18) under this assumption. However, $J_\alpha$ depends on $\alpha$, which can change significantly, particularly at shallow depths. This dependence was studied in detail in [Ref. 7].

For the tests considered in this study, the desired charge was PBXN-111. However, at the time of the study the bubble parameters for this charge were not available so parameters for PBXN-103 were used instead. Based on our previous analysis ([Ref. 7], Table 3-7), the values used in this study are $$\gamma = 123, q = 0.4, \text{ and } J_\infty = 18.8. \tag{19}$$

Shock Effects

Figure 2:
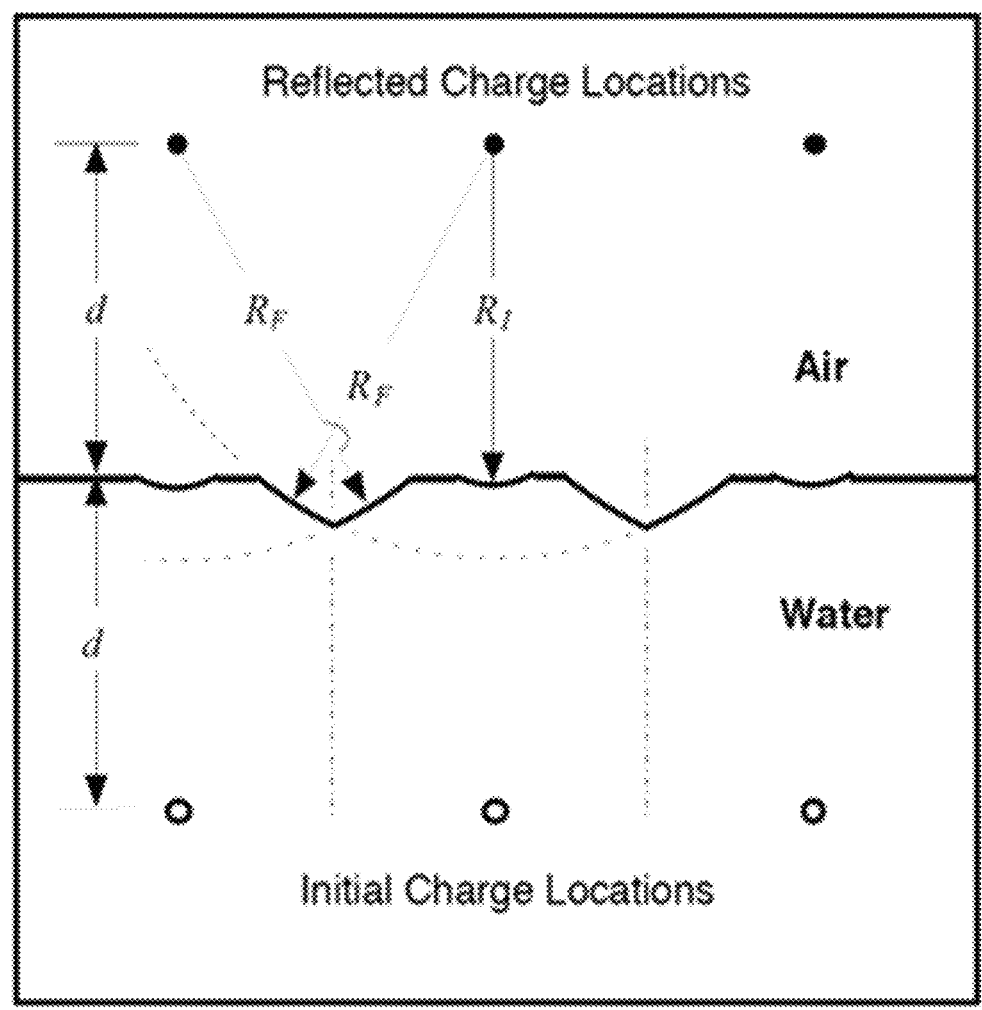
FIG. 2 shows an empirical model for shock effects.

It was noted by Kedrinskii in [Ref. 16] that using an incompressible liquid model for shallow-depth explosion simulations generally under-predicts the plume heights for early times. It has been demonstrated in [Refs. 7, 8 and 16], that an indentation of the free surface directly above the charge will increase the plume heights predicted by an incompressible liquid model. This indentation represents the effects of spalling from the reflection of the detonation shock wave from the surface. In addition to this reflection, shock interaction from the simultaneous detonation of multiple charges has been shown to cause plume fingering between the initial charge locations. An empirical model for this phenomenon is shown in FIG. 2. For the computations presented here only single charges were considered so that $R_F$ is not relevant, and we used $R_F=1.03D$ based on comparisons to plume heights performed in [Ref. 7].

Numerical Results

Computations were performed in an axially symmetric domain with $0 \le r \le R$, and $Z_B \le z \le Z_T$ where z=0 corresponds to the ambient air-water free surface. The grids used for the computations were comprised of uniform square cells of size h in the sub-region $0 \le r \le 8$, $-10 \le z \le 10$ in units of feet. Outside of the uniform region the grids are stretched to the boundary of the domain in which R=40, $Z_B=-20$ and $Z_T=120$. In order to study the numerical errors, computations were performed using a "coarse" grid using a total of 120×400 cells with h=0.1, and a "fine" grid using 240×800 cells with h=0.05.

Effective Water Length

The results are presented using density contours at different times of the bubble evolution as well as measurements of the equivalent water length (EWL) as a function of both height above the surface and time. For this analysis we consider the idealized case of a missile travelling along a horizontal line at a given height $z=z_H$. Setting the initial location of the charge at coordinates $(x_c,y_c,z_c)=(0,0,-d)$ and assuming that the missile travels on a straight line trajectory from $(-x_o,S,z_H)$ moving in the positive x-direction with an infinite velocity. Then the Equivalent Water Length for this trajectory at time t is $$EWL(t, S, z_H) = \frac{1}{\rho_0}\int_{-x_0}^{\infty} \rho(t, x, S, z_H)dx \tag{20}$$

where $\rho_0$ is the ambient density of the water $\rho(t,x,S,z_H)$ is the density of the spray (water-air) mixture at time t S is the offset of the trajectory from the charge center $z_H$ is the height of the trajectory.

The values for $\rho(t,x,S,z_H)$ will be approximated using an axially symmetric computation using the BUB2D code which produced values $$\rho_{i,j}^n$$

at discrete times $t=t^n$, at cell center locations $(r_i,z_j)$ where $r=\sqrt{x^2+y^2}$ is the distance from the axis. We can also express $$EWL(t, S, z_H) = \frac{1}{\rho_0}\int_{-x_0}^{\infty} \rho_h(t, r(x, S), z_H)dx \tag{21}$$

if for example, we assume $\rho_h$ is piecewise linear in time and piecewise constant in space. That is, assume the grid used for the computations is partitioned by vertex points $0=r_1 < r_2 < \ldots < r_{N_r}$ and similarly for z then $\rho_h(t,r,z)=\rho_{i,j}(t)$ if $r_i \le r < r_{i+1}$ and $z_j \le z < z_{j+1}$, where $$\rho_{i,j}(t) = \frac{t^{n+1} - t}{t^{n+1} - t^n}\rho_{i,j}^n + \frac{t - t^n}{t^{n+1} - t^n}\rho_{i,j}^{n+1} \tag{22}$$

is the linear interpolant in time if $t^n \le t \le t^{n+1}$.

The integral (Eq. (22)) will be approximated by first truncating the limits to lie between say −L and L where L is sufficiently large so that the density remains nearly 0 there. We can then apply a midpoint rule using N subdivisions to obtain $$
EWL(t, S, z_0) = \frac{\dfrac{1}{p_w} \displaystyle\int_{-x_0}^{\infty} \rho_h(t, r(x, S), z_H)dx}{\dfrac{1}{\rho_w} \displaystyle\int_{-L}^{l} \rho_h(t, r(x, S), z_H)dx}
$$

$$
\approx \frac{2L}{\rho_w N}\sum_{k=1}^{N}\rho_h(t, r(x_k, S), z_H) = \frac{2L}{\rho_w N}\sum_{k=1}^{N}\rho_{h,I(k),j}(t) \tag{23}
$$

$$
\text{where } x_k = L\left(\frac{2k - N - 1}{N}\right).
$$

i=I(k) is the index such that $r_i \le r < r_{i+1}$ and similarly $z_j \le z_H \le z_{j+1}$.

In particular the maximum values of Eq. (23) will usually occur when S=0 which will be evaluated as a "best case scenario". The goal of these predictions is to demonstrate conditions under which the EWL values are larger than 4 ft. at a height of 8 feet, that is, EWL(t,0,8)>4 for a sufficiently large time interval.

Run Matrix

The initial plan called for predictions using charge weights of 1, 1.5, and 2 lbs, at depths of 3, 4 and 5 feet. An important parameter for the behavior of shallow depth explosion is the scaled depth defined by $$
C = \frac{D}{A_{max}} \tag{24}
$$

The scaled depths corresponding to this set of tests are listed in Table 1. For some critical value of C=C*<0.56 the bubble gas will escape into the atmosphere during its first expansion and contraction phase. Although the critical value has not been precisely defined in the literature (e.g., Kedrinski [Ref. 16] gives the value as 1, but Blake and Gibson [Ref 17] clearly show an example where C=0.56 which does not vent). It is likely that the there is a transition region where the bubble partially vents into the atmosphere with the amount of venting depending on C. In [Ref. 18], Young gives the bound C*=0.2 below which the gas can be observed surrounding a central column of water in the plume. Experiments performed at the University of Maryland [Ref. 19] using small-scale RP80 charges on a sandy bottom yielded an approximate value C*≈0.25 in rough agreement with Young's estimate. Based on that data we expect little or no venting even for the range of trials listed in Table 1 where C>0.448.

TABLE 1

| Scaled depths for the original run matrix | | | |
|---|---|---|---|
| Depth | Charge Weight (lbs) | | |
| (ft) | 1.0 | 1.5 | 2.0 |
| 3 | 0.565 | 0.493 | 0.448 |
| 4 | 0.760 | 0.664 | 0.603 |
| 5 | 0.959 | 0.838 | 0.761 |

However, there is no reason to assume that the maximum amount of water will be thrown upward in the case of a non-venting bubble. Therefore, we have extended the computations to include cases through the transition region when the bubble can be expected to vent at early times. In particular we will examine the effect of decreasing the charge depth to d=1 foot, for the charge weight W=2 lbs. case. At this depth and charge weight the scaled depth, C=0.147 is below the critical value for venting. In order to continue the numerical experiments for shallower depth cases, we determined that the bubble cutoff parameter $\varepsilon_\rho$ used in Eqs. (11) and (12) with $\varepsilon_A$=0.95 and $\varepsilon_B$=0.5 were best suited to reproduce the venting phenomenon for shallow charge depths C<0.5.

Grid Effects and Numerical Error

We begin by using the same resolution for the grids described in the previous section and approximate the known solution for the case of a spherical bubble in an infinite incompressible medium, governed by the Rayleigh-Plesset equation $$
a\ddot{a} + \frac{3}{2}\dot{a}^2 = \frac{1}{\rho_0}(p_B - P_\infty) \tag{25}
$$

where a=a(t) is the bubble radius at time t, $$
\dot{a} = \frac{da}{dt}.
$$

Here we used the initial conditions for a two pound charge with the pressure at infinity, $P_\infty$=36.9 feet of water (fw), corresponding to the hydrostatic pressure at a depth of 3 feet. Using the empirical relations (Eqs. (13-19)) gives $$
a(0) = A_{min} = 0.503968 \text{ ft}, \quad p_B^0 = 23870.8 \, fw \tag{26}
$$

so that the maximum radius is $A_{max}$=6.69211 ft and the period is $T_\infty$=0.372236 s.

For the infinite domain problem there are three sources of error, namely the nominal spatial discretization size h, the time step sizes and the boundary truncation. The time steps are selected adaptively based on changes in the bubble volume. The values listed in Table 2 compare the errors in the bubble period (time to first minimum) and bubble maximum radius from two separate computations of the infinite domain problem. In this table the value L is the distance from the computational boundary to the charge center, $N_x$ is the number of cells used in each direction for the computation, $N_T$ is the total number of time steps taken before the final time of $T_f$=0.4. Note that the value of $N_x$ on the fine grid is more than double the value on the coarser grid since the domain size was also doubled in each direction. The computational results are indicated by $$
A_{max}^h
$$

for the maximum bubble radius and $T^h$ for the first bubble period. The value $$A_{max}^h$$

is determined from the maximum volume computed using Eq. (8) for a sphere of equivalent volume. The errors (E) are listed as relative errors between the computed values and the exact values listed above. These results indicate the accuracy of the code for obtaining the critical bubble dynamics parameters, which in turn affect the dynamics of shallow water plumes. For the computations of the shallow plume dynamics presented next, all the results were based on the h=0.05 grid so that we expect approximately 1% error in the maximum equivalent bubble radius and about 4% for the period. We also remark that the values $\varepsilon_A$=0.95 and $\varepsilon_B$=0.5 (see (12)) were also used for these computations.

TABLE 2

| Symmetric bubble simulation results. | | | | | | | |
|---|---|---|---|---|---|---|---|
| h | L | $N_x$ | $N_T$ | $A_{max}^h$ | $E(A_{max}^h)$ | $T_h$ | $E(T^h)$ |
| 0.1 | 50 | 140 | 823 | 6.5735 | 1.77% | 0.3448 | 7.38% |
| 0.05 | 100 | 400 | 1581 | 6.6382 | 0.81% | 0.3567 | 3.94% |

Figures 3A, 3B:
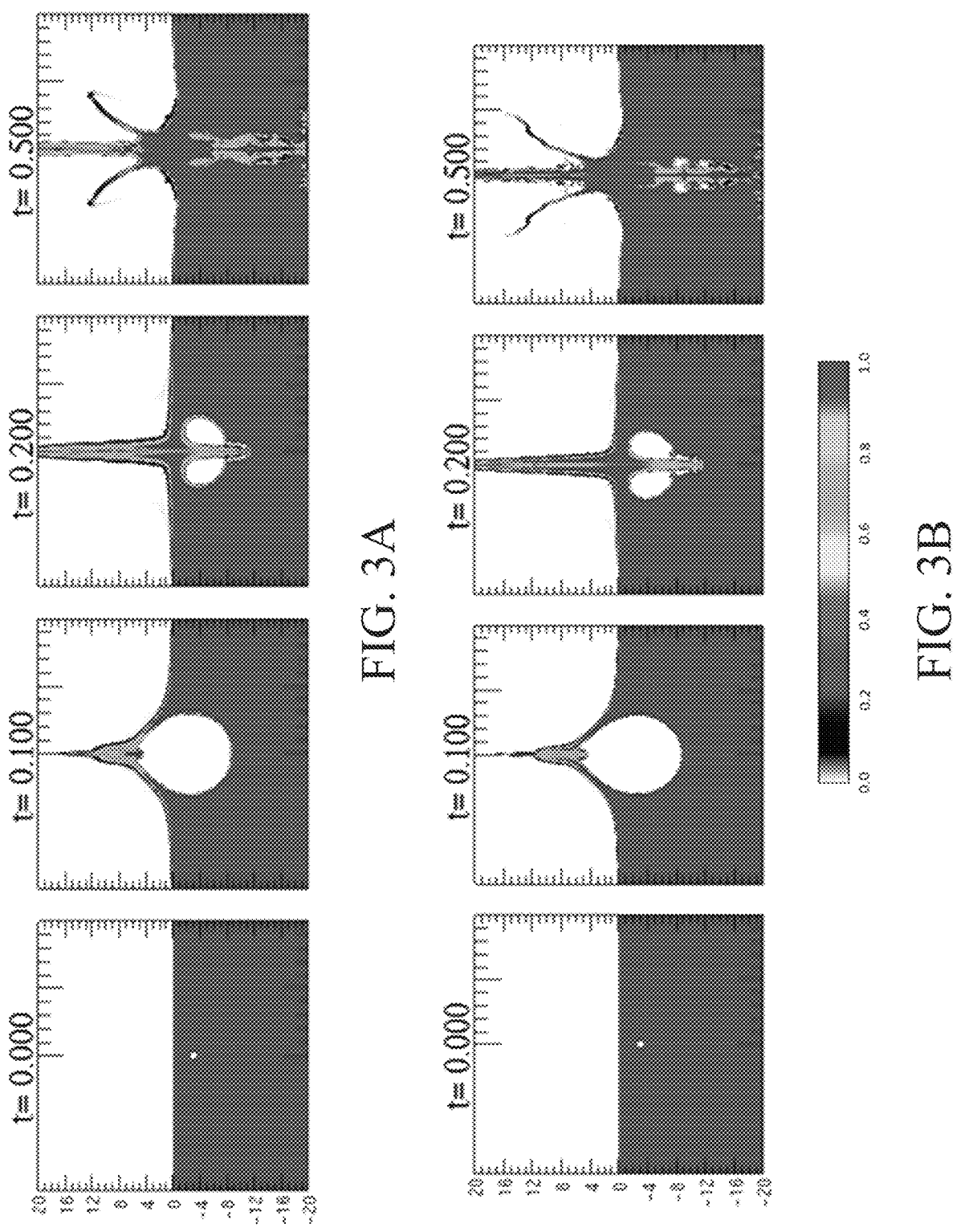
FIGS. 3A and 3B show Run W2D3 coarse (3A) and fine (3B) grid density contours at early times.
Figures 4A, 4B:
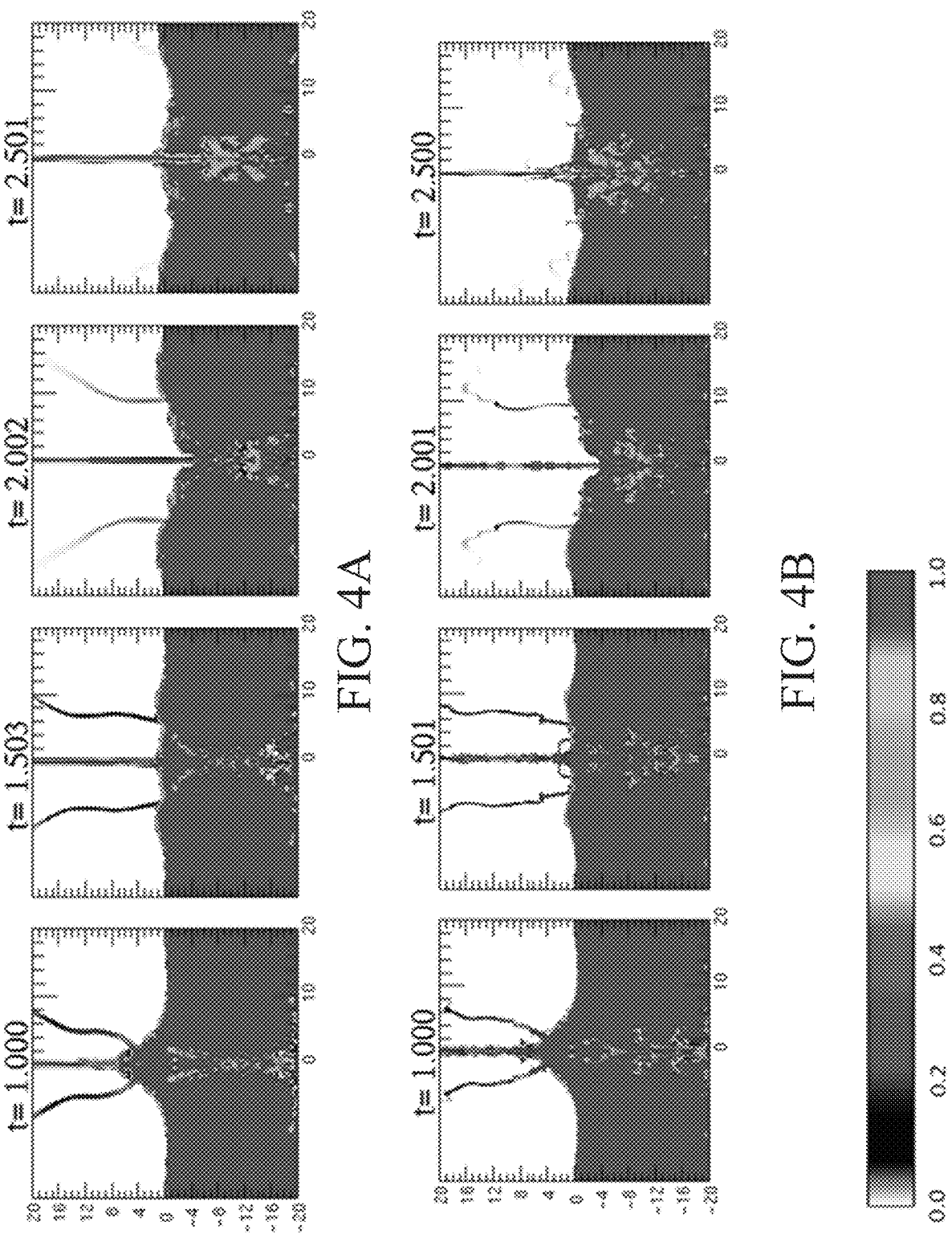
FIGS. 4A and 4B show Run W2D3 coarse (4A) and fine (4B) grid density contours at late times.

FIGS. 3 and 4 display the difference from the coarse and fine grids for the case for a 2 lb. charge weight and an initial depth of 3 feet (W2D3). This represents a shallow depth non-venting case. The early time t≤0.5 behavior is displayed in FIG. 3, with the top row displaying the contours resulting from the coarse grid, and the corresponding fine grid results immediately below. The results from both grids are qualitatively very similar, with each predicting a central plume above the bubble at t=0.1 s when the bubble is near its maximum volume. As the bubble begins to compress a downward moving plume is seen piercing through the bubble and impacting the bottom surface at t=0.2 s. During the next re-expansion radial plumes are ejected surrounding the central plume as seen at t=0.5 s. The evolution of the plumes rising and falling at later times t≥1 s is matched very well on each grid as seen comparing the top (coarse grid) and bottom (fine grid) rows. The relative density palette used for the contours are shown below the frame images in both figures, so that blue corresponds to pure water, and white corresponds to void. The use of $\varepsilon_B$=0.5 permits the "liquid" region in the plume above the bubble at early times to have density levels $$0.5 \le \frac{\rho}{\rho_0} \le 1$$

as seen in these images.

Water Barrier Measurements

Figure 5:
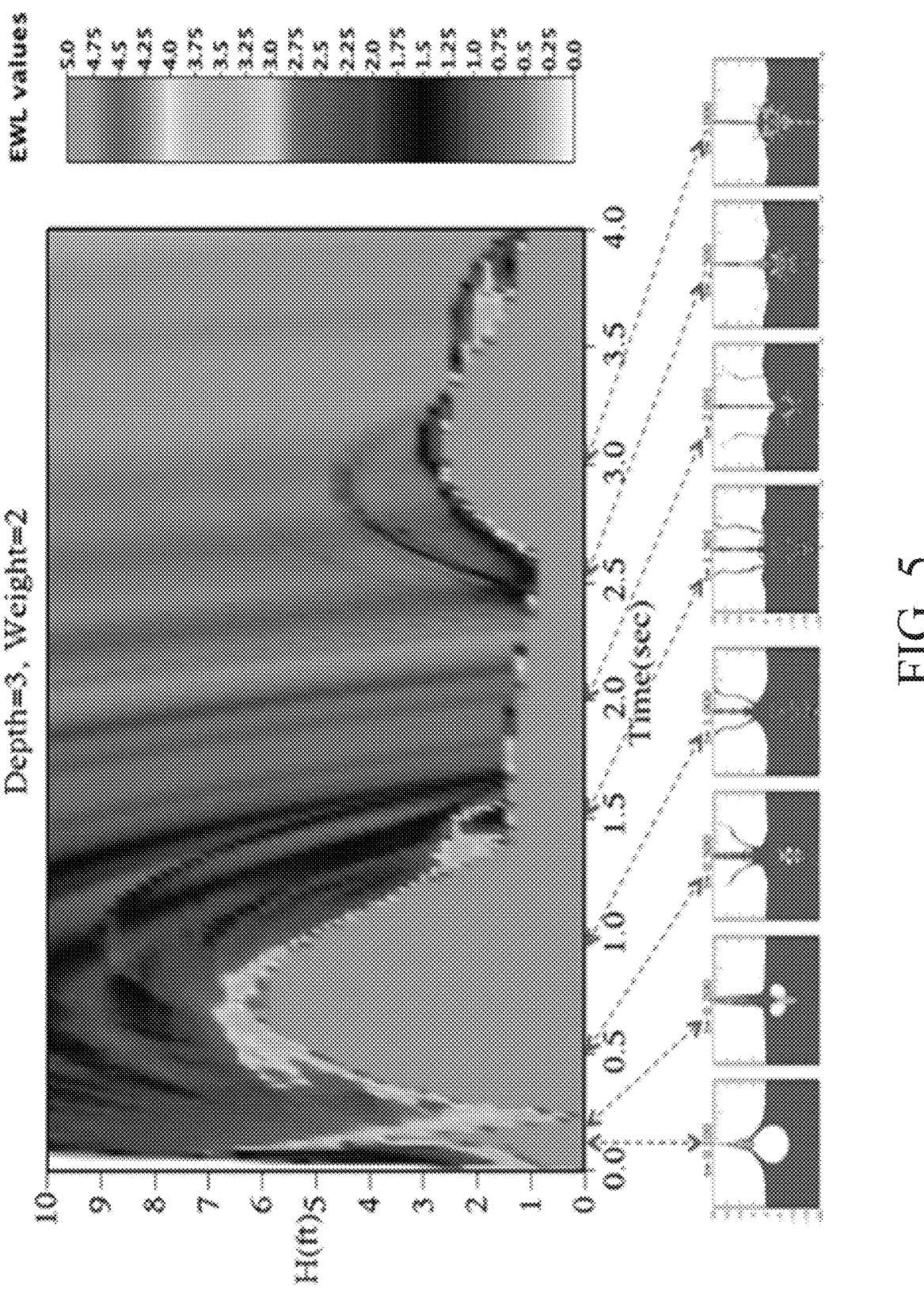
FIG. 5 shows EWL Contours with Plume events for the W2D3 case.
Figure 6:
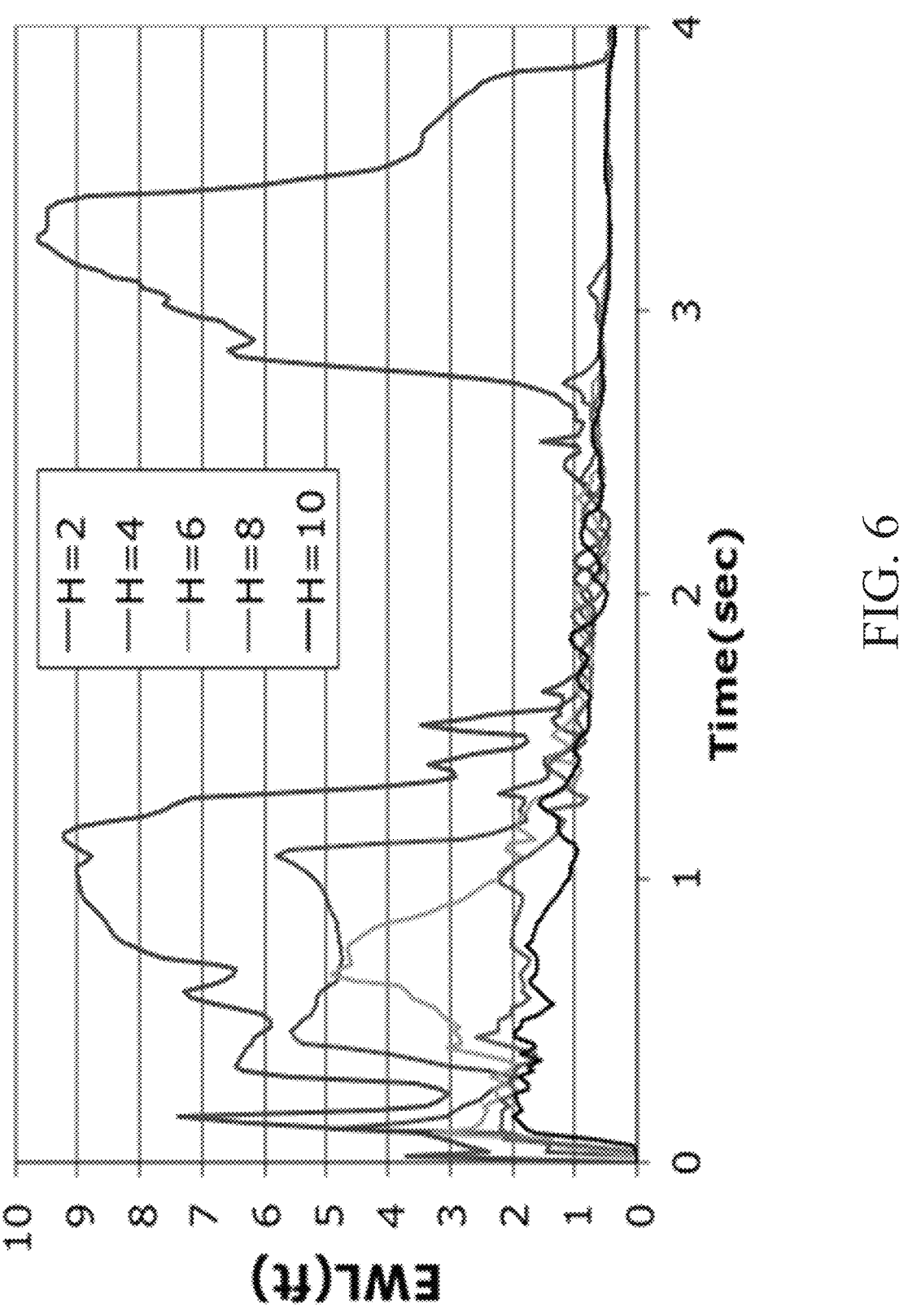
FIG. 6 shows EWL values at different heights as a function of time for the W2D3 case.

For the water barrier measurements, we computed the values EWL(t,0,z) given by Eq. (23) through the center of the plume using a density contour plot shown in FIG. 5 for the D3W2 case using the fine grid. Below the EWL contour are the corresponding density contours at various discrete times and heights from 0 to 10 feet above the surface. In the contour plot, EWL values larger than 5 are simply shown as light red as indicated in the palette on the right.

Figure 7:
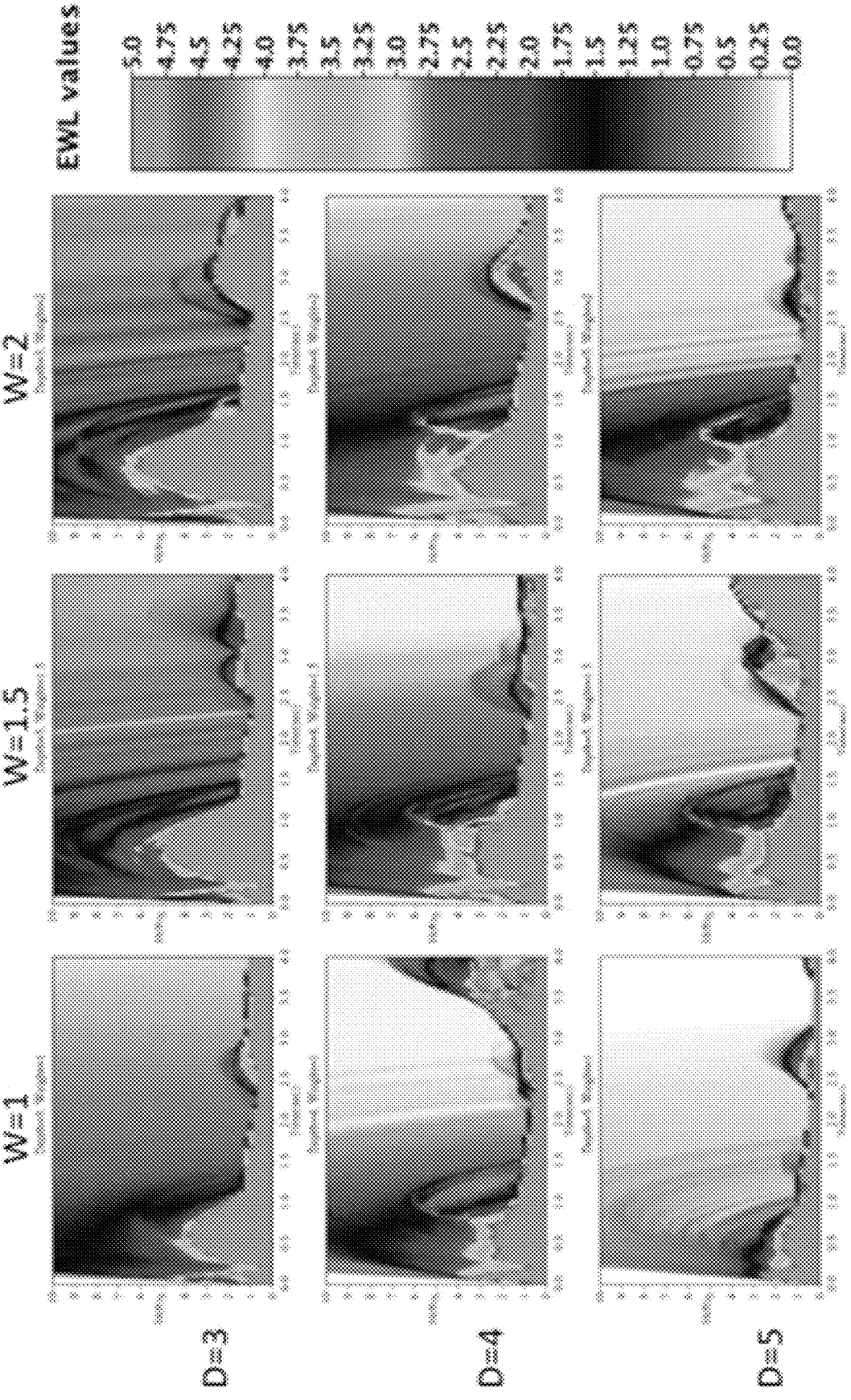
FIG. 7 shows a Comparison of EWL contour levels for the original run matrix.

The contours of EWL values for the original run matrix in Table 1 are shown in FIG. 7. This figure clearly indicates higher EWL values for larger charges and shallower depths within this range. Furthermore, according to the scaled depths listed in Table 1, we would expect similar behavior from the case W1D4 and W2D5 (with both length and time scaled by the factor $$\sqrt[3]{2} \approx 1.26).$$

Figures 8A, 8B:
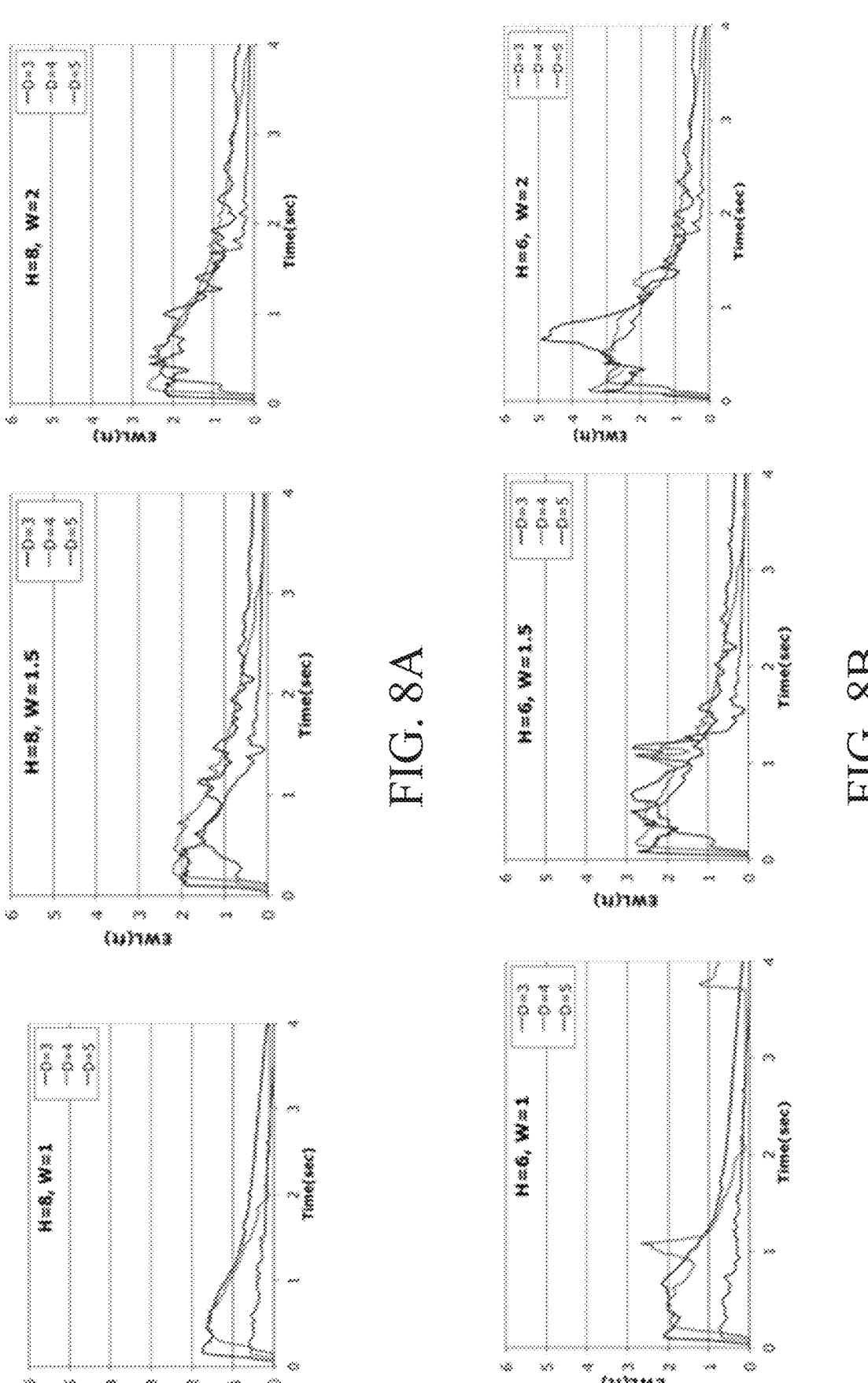
FIGS. 8A, 8B and 8C show EWL values as a function of time at different heights for the original run matrix.
Figure 8C:
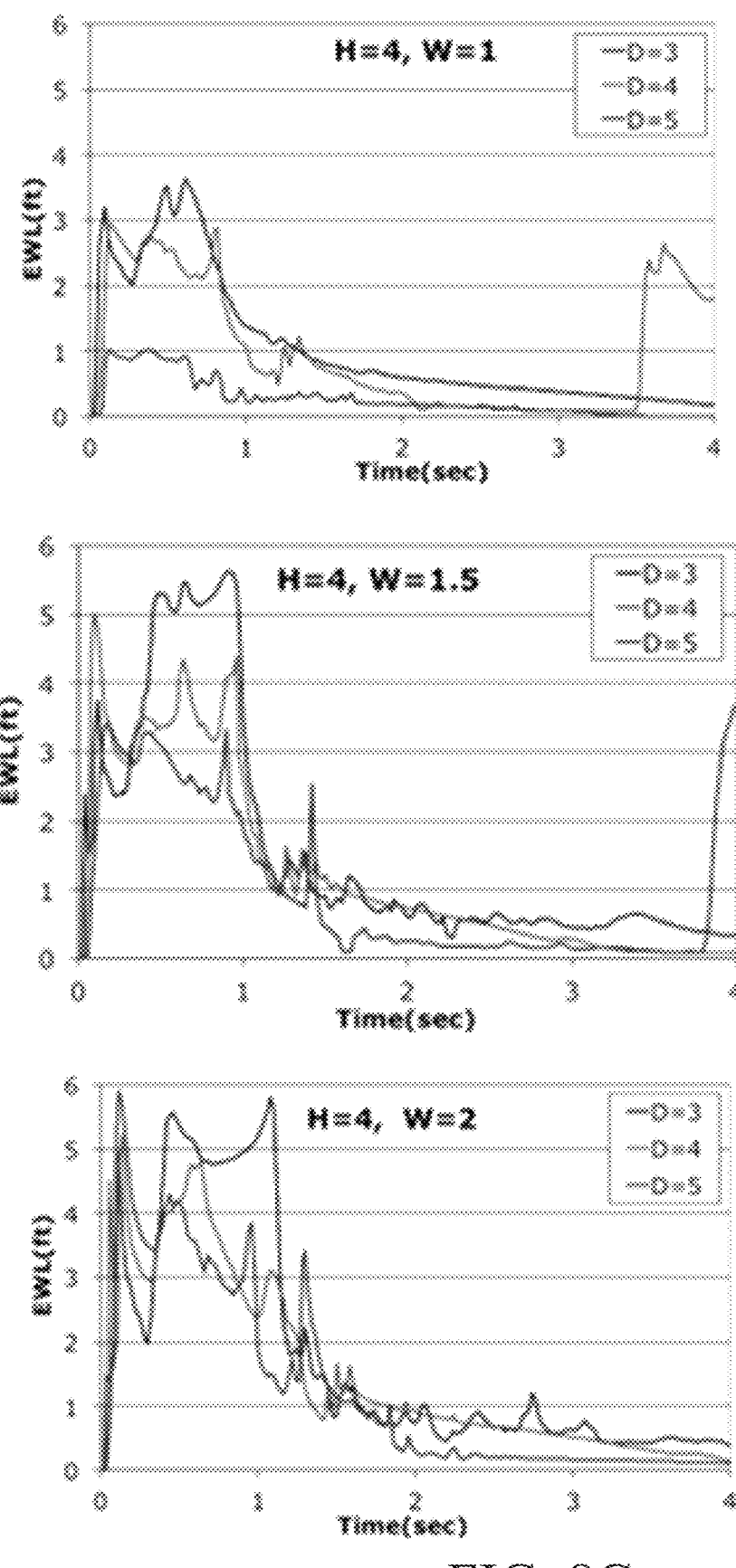

This is clearly reflected in FIG. 7, as well as the similarity between the W1D3 and W2D4 case. This scaling is not exact since gravity will have a slightly greater influence in the larger charge case. Plots of the computed values EWL(t,0,H) for H=4, 6, and 8 for the run matrix are shown in FIG. 8. None of these cases produced values that attained the desired value of 4 ft at the H=8 ft height level, but this value is attained at H=4 ft, for charge weights W≥1.5.

Plume Velocity

Figure 9A:
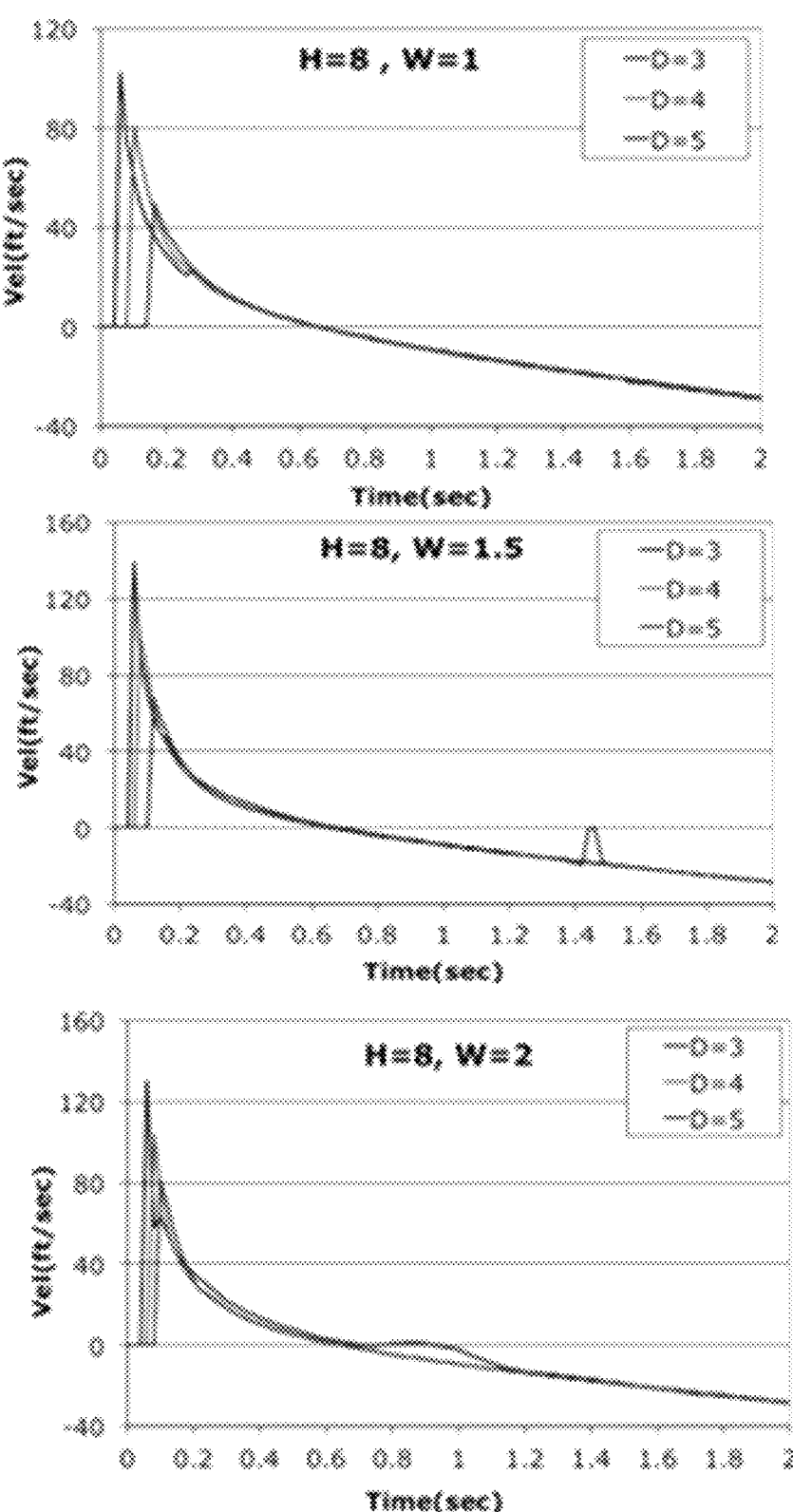
FIGS. 9A, 9B and 9C show Vertical plume velocities at different heights for the original run matrix.
Figure 9B:
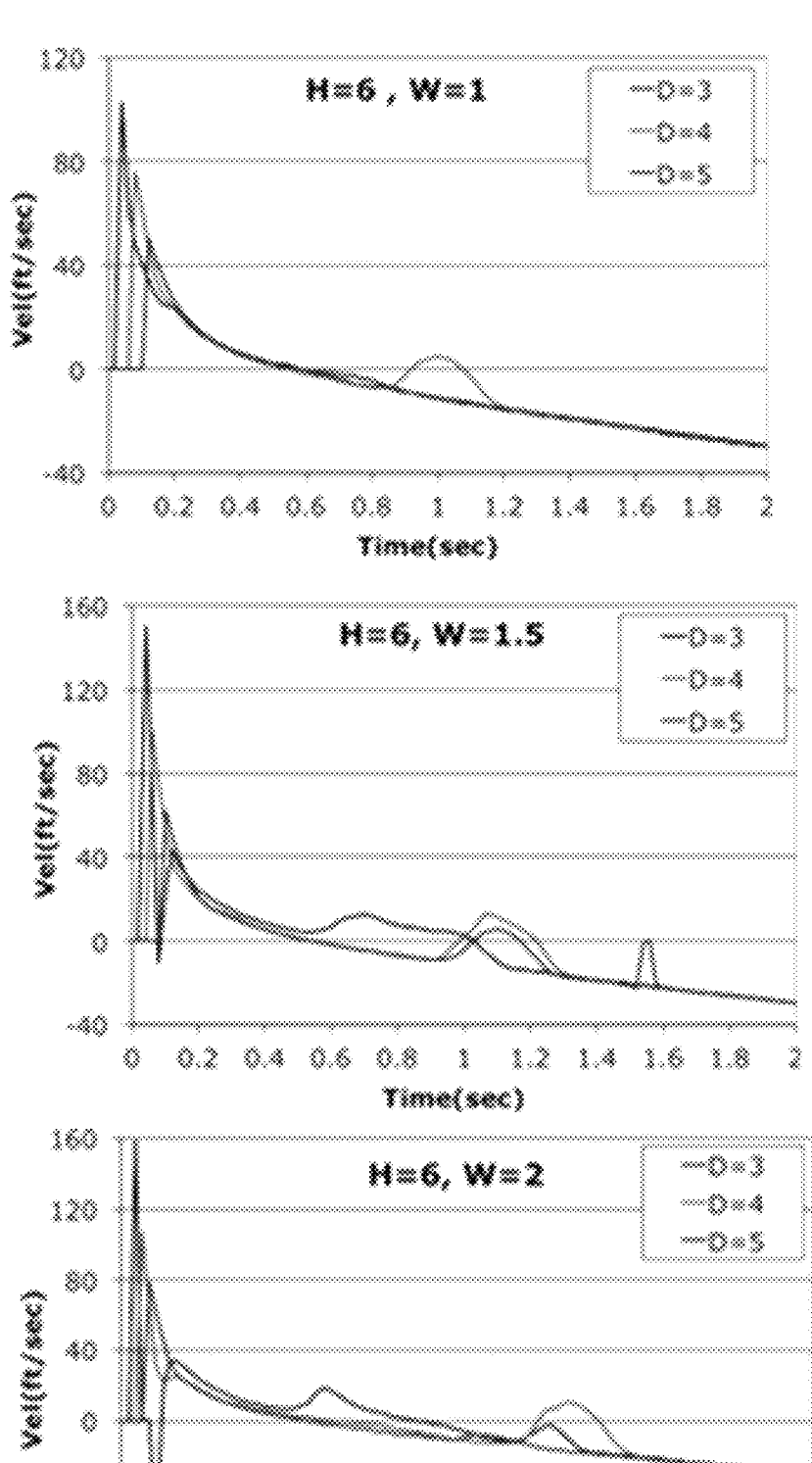
Figure 9C:
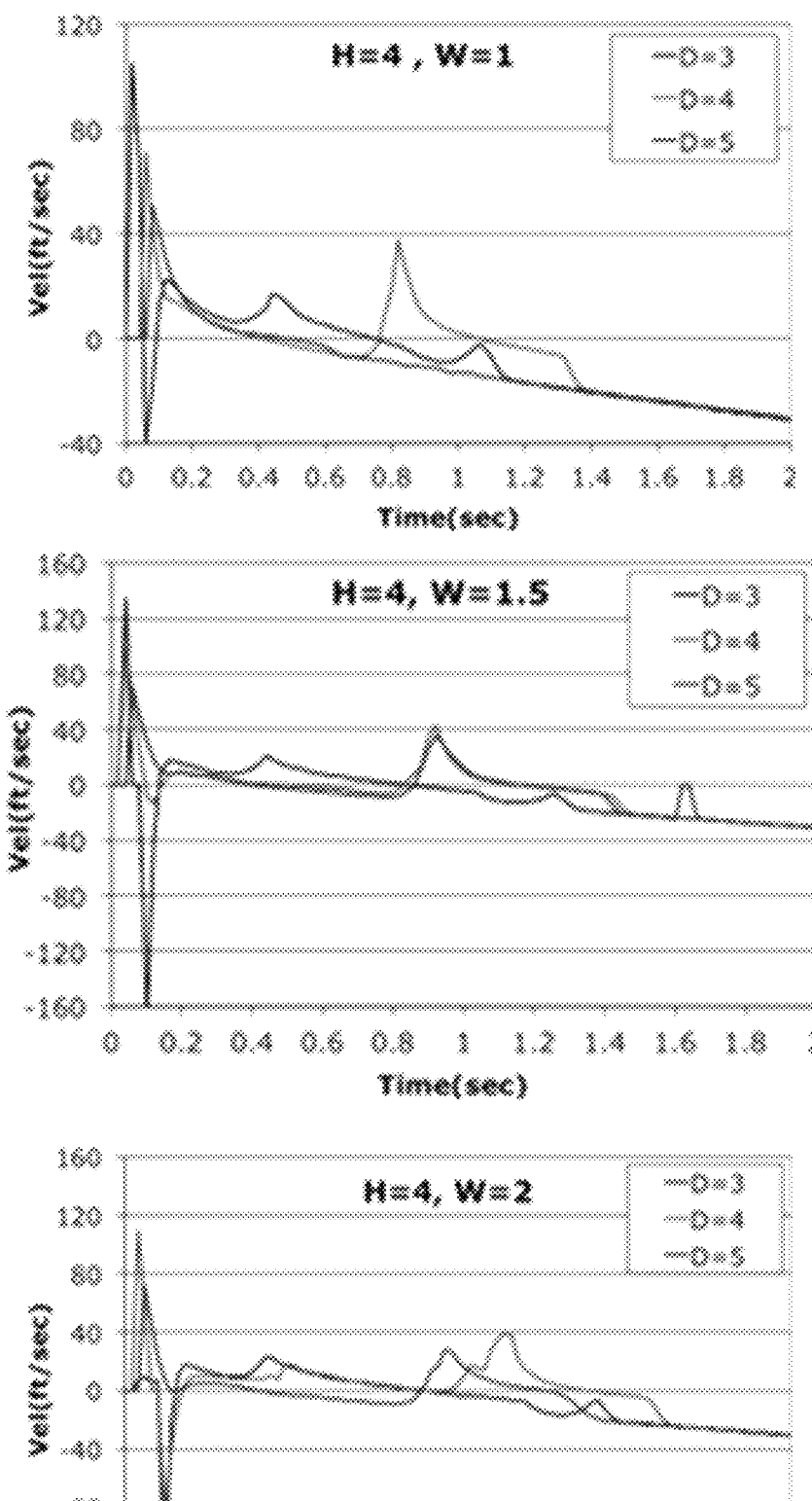

The plume velocity may also enhance its protective ability as a barrier, potentially deflecting a missile by imparting a vertical momentum. The vertical velocity component along the axis, v(t,0,H), is shown in FIG. 9 for the same cases as shown for the EWL values in FIG. 8. Note the large negative downward velocities reported at the lower H=4 ft height at early times. These negative velocities indicate the downward jet seen during the beginning of the first bubble contraction shown in FIG. 3 at times t=0.1 and t=0.2 seconds. The upward moving jet can be expected to attain speeds of 100 ft/s or larger, during the time of the first bubble expansion, after which it is decelerated primarily due to gravity. We remark that here we are only showing the vertical velocities along the axis and are thereby ignoring the velocity of the radial plumed ejected during the beginning of the second bubble expansion.

Extended Depth Study

Figure 10:
FIG. 10 shows EWL Contours for 2 lb. charges at depths between 2 and 3 feet.
Figure 10:
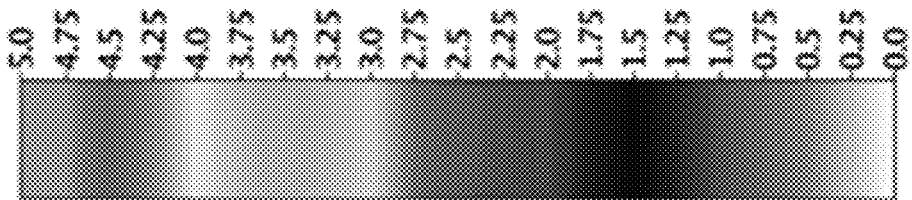

For the sake of completeness, the original run matrix was extended to even shallower initial charge depths. In particular, for the 2 lb charge the cases 2≤D<3 were simulated with the resulting EWL contours displayed in FIG. 10. In these cases, larger EWL values (>5 ft) occur up to heights of 7 feet at a depth D=2.5, but then these values drop below 4 ft as the charge depth decreases.

Figure 11:
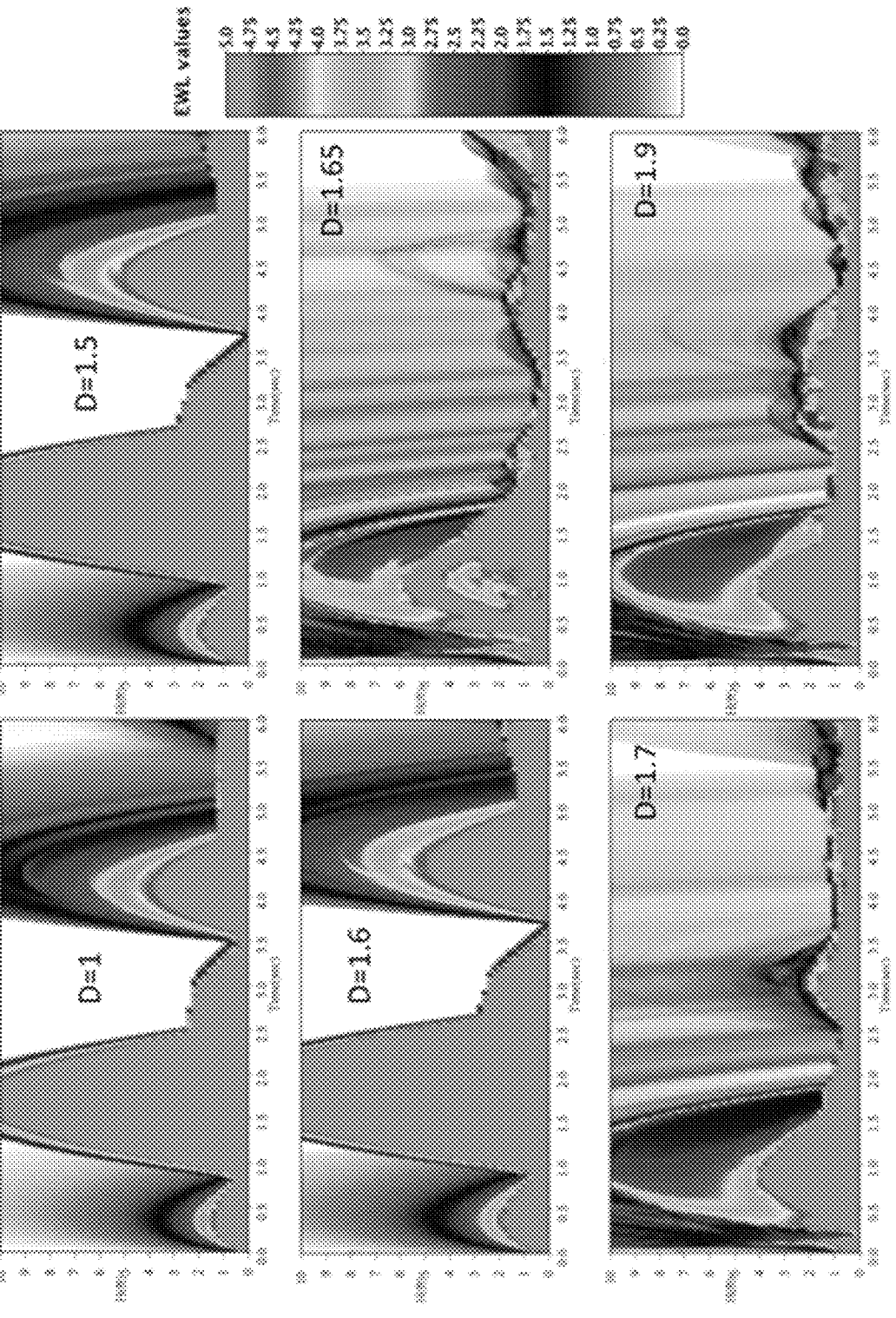
FIG. 11 shows EWL Contours for 2 lb. charges at depths between 1 and 2 feet.
Figure 12:
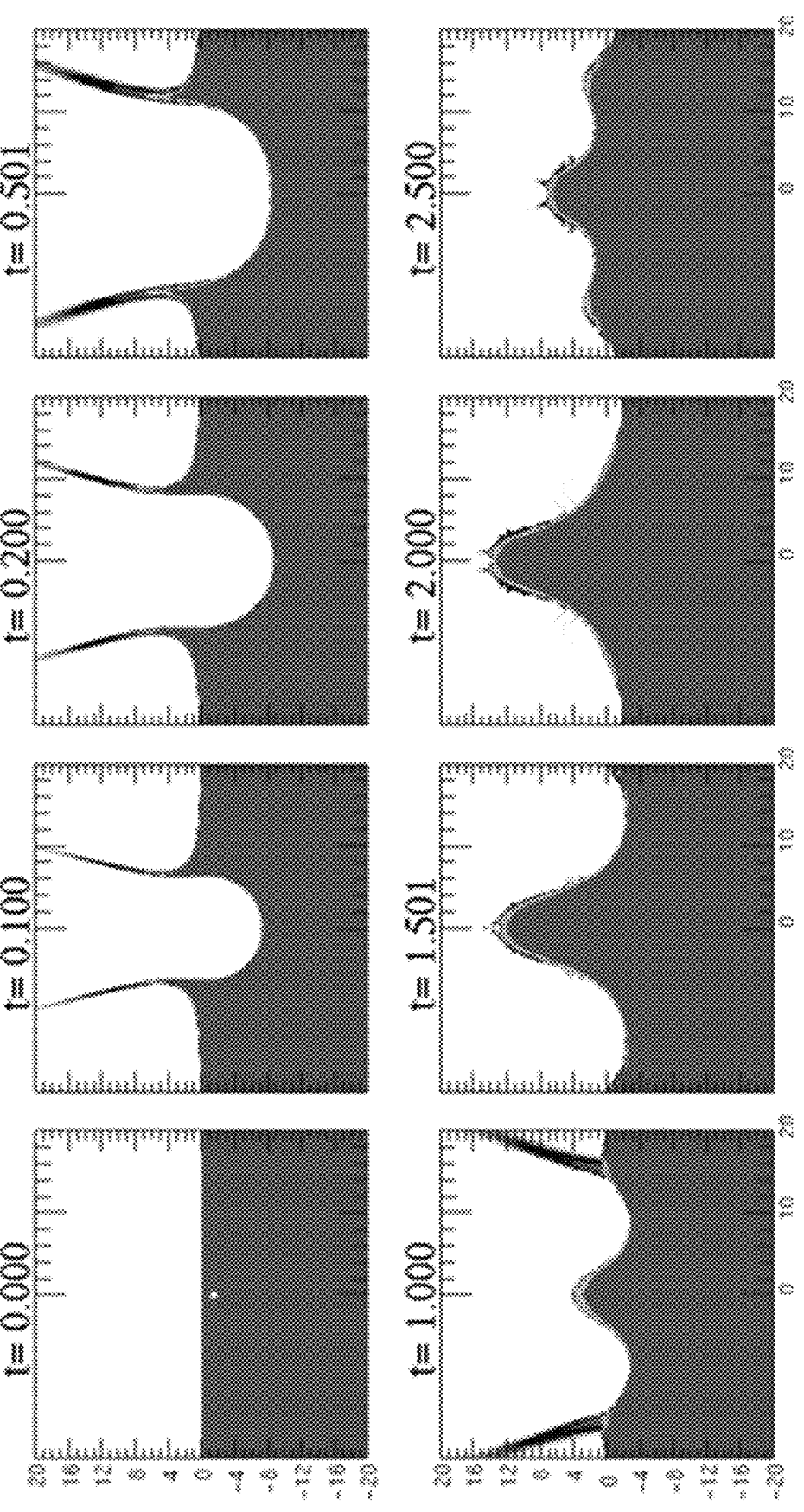
FIG. 12 shows Density contours for the W2D1.5 computation.

The results were further extended to the range 1≤D<2 with EWL contours shown in FIG. 11. In this case the transition between the case when the bubble vents or not before its first collapse occurs at a depth of approximately D=1.65 ft, corresponding to a scaled depth of C=0.243. For depths shallower than this, the central plume weakens and instead of a persisting bubble, a cavity forms at the water surface. The rebound of this cavity is seen in FIG. 12 for the case W2D1.5 and causes large EWL values at heights up to about 12 feet.

Figure 13:
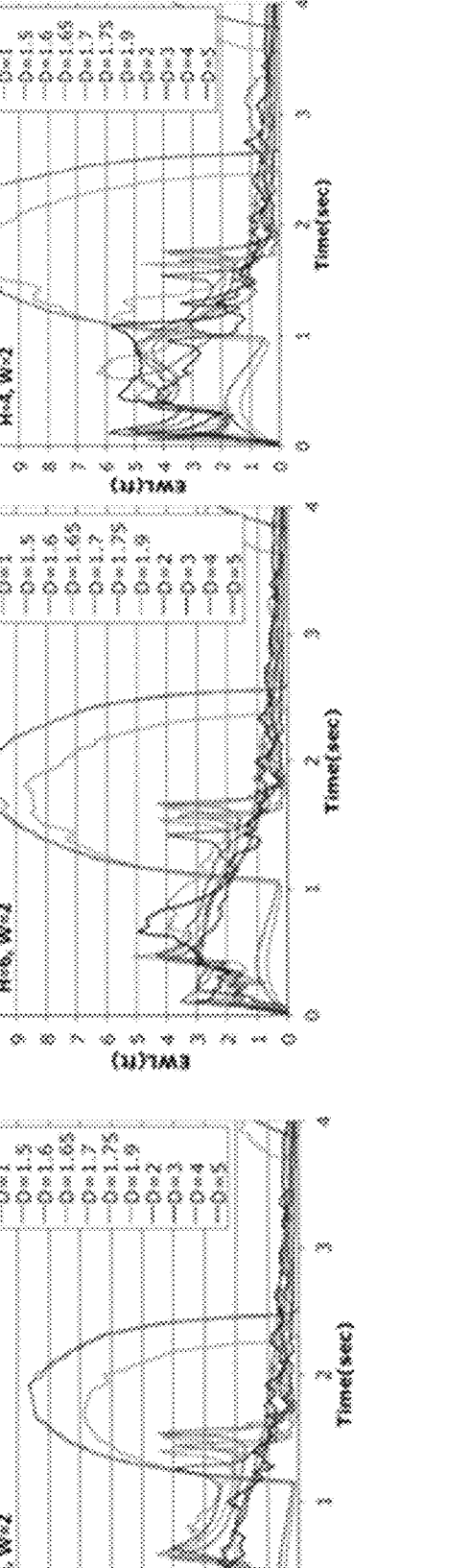
FIG. 13 shows EWL levels for W=2 at heights H=8 (left), H=6 (center) and H=4 (right).

The values EWL(t,0,H) for H=4, 6, and 8 with the 2 lb. charge, at all computed charge depths for the W=2 lb. charge is shown in FIG. 13. Here the transition from venting to non-venting bubble can be clearly seen by the dramatic difference in EWL profiles between the cases in which D≤1.6 (venting) and D≥1.65 (non-venting). We remark, that due to the dramatic phenomenological change we expect large uncertainty and errors near this transition depth.

Boundary Condition Effects

The effects of two different boundary regions were also compared to the z≥$z_B$=−20, cases described above. For these comparisons the charge weight was fixed at W=2 lbs, and the initial depth was set at D=3 ft. In the first case, the initial water region was restricted to a cylindrical "pool" having dimensions r≤R=9 and 0≥z≥$Z_B$=−8. The purpose of this simulation was for a preliminary investigation for designing test experiments in a controlled environment. In the second case only, the bottom boundary was changed so that $0 \geq z \geq Z_B = -3$. In this case the initial bubble was the top half of a hemisphere situated at the bottom boundary. The hemisphere has the same volume as the initial spherical region as the initial bubble according to ([Refs. 13-17]). In each case the grid was chosen to match the original fine grid with uniform cells of size h=0.05 for z≤10 and r≤8.

Figures 14A, 14B, 14C:
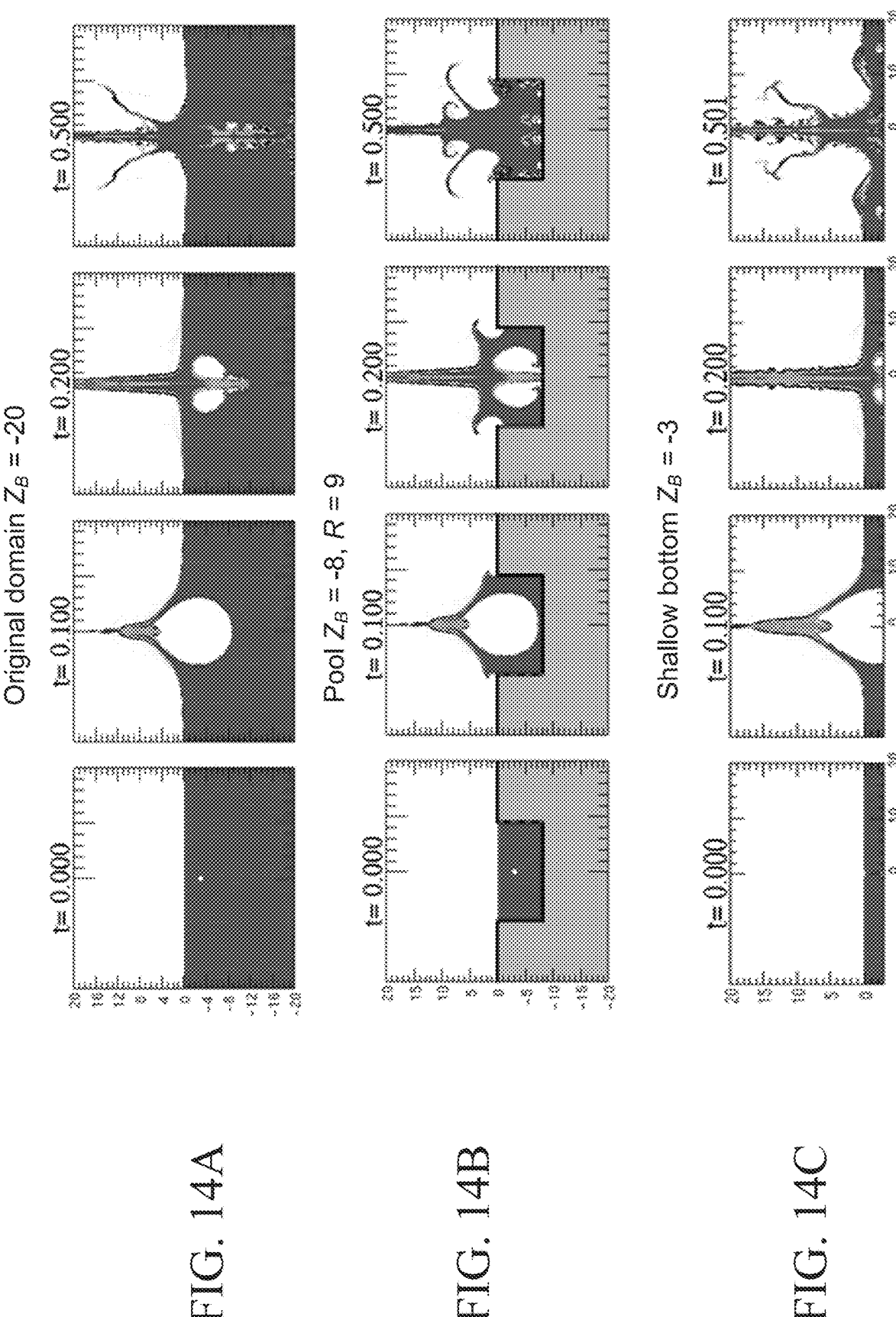
FIGS. 14A, 14B and 14C show early time boundary effects W2D3 case.
Figure 15:
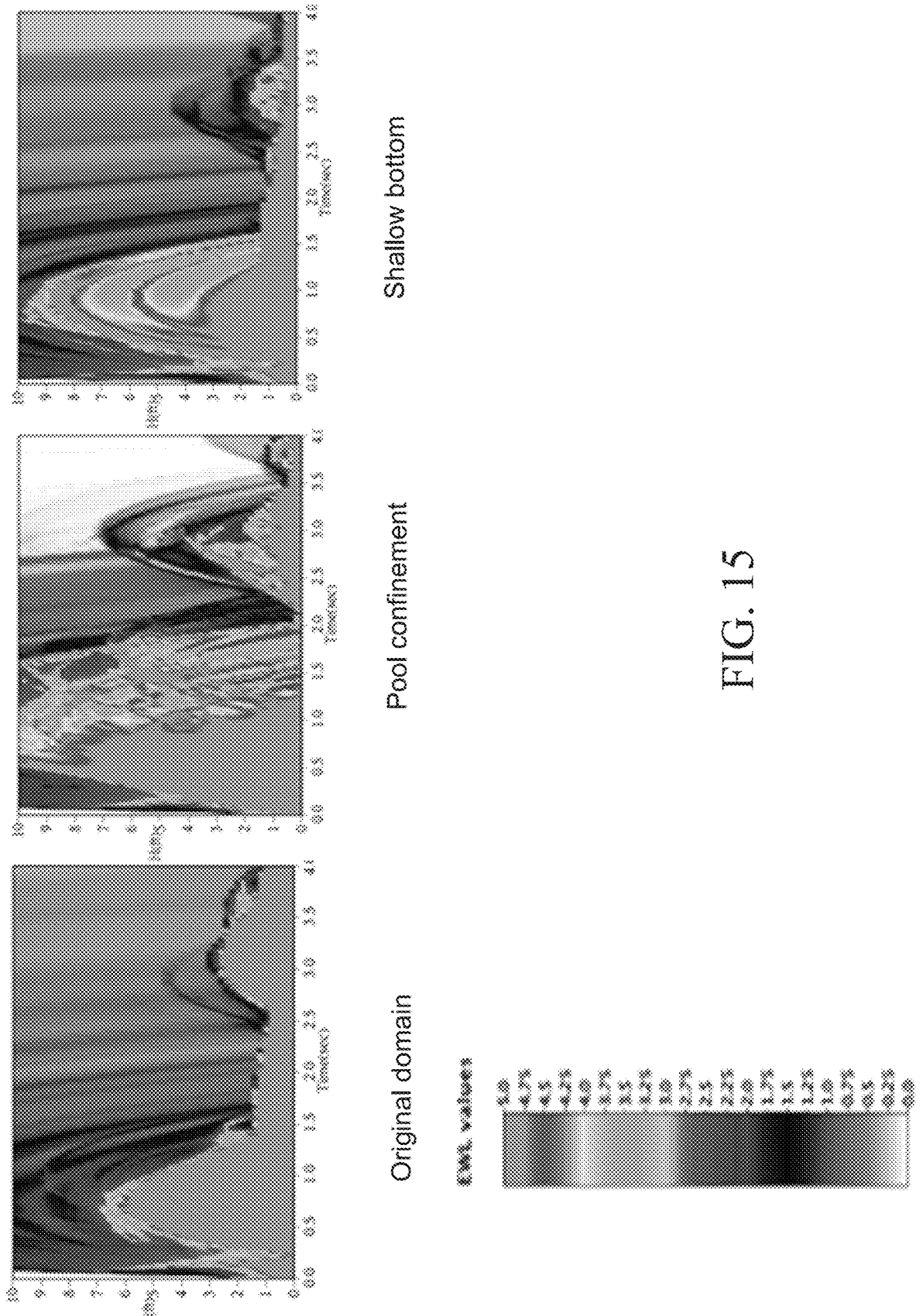
FIG. 15 shows EWL contours for the W2D3 case with different boundaries.
Figure 16:
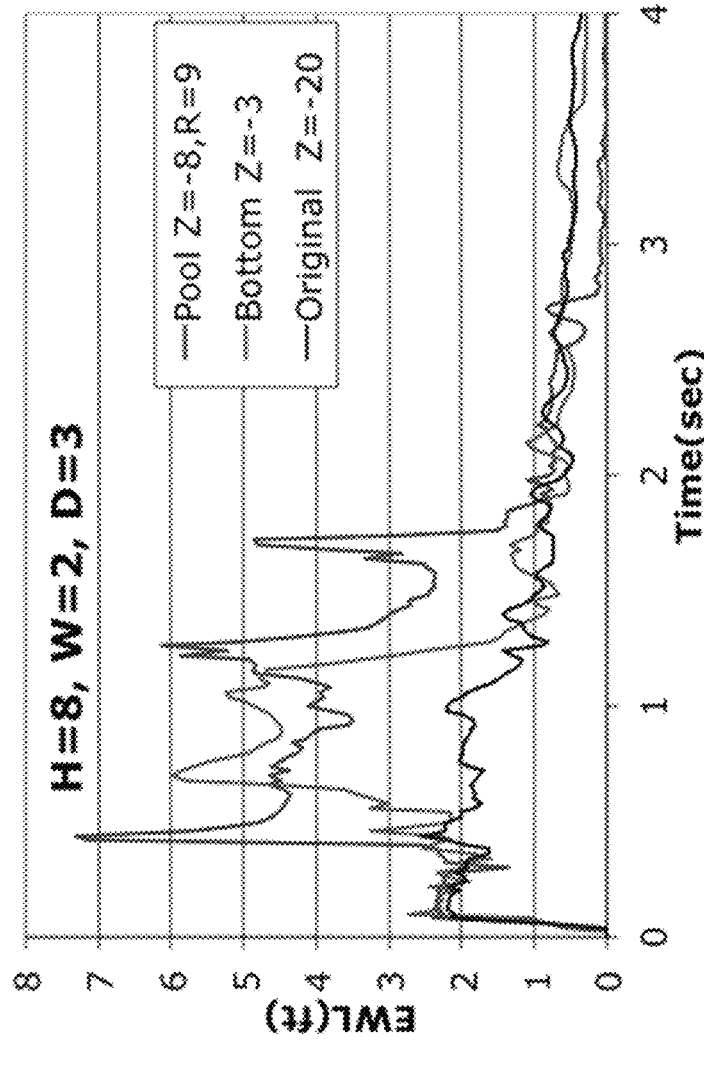
FIG. 16 shows EWL values at H=8, for the W2D3 cases with different boundary locations.

FIG. 14, exhibits the early time plume and bubble contours for the original domain compared to the two restricted domain cases. A comparison of the corresponding EWL contours shown in FIG. 15, indicate that both restricted domains increase the amount of water thrown upward. This is seen clearer in FIG. 16 showing graphs of EWL(t,0,8) for the three different domains. In the original domain the water surrounding the charge is pushed outward nearly spherically in each direction. In the case of shallow water when the charge is sitting at the bottom boundary, all of the water is pushed upward or radially outward (hemispherically). Thus, more water can be expected to be pushed upward than in the original domain (since the total volume displaced will be about the same, but none will be displaced downward). In the case of the confined pool, a significant portion of the radial velocity is converted to vertical velocity at the pool side boundaries, again causing more water to be directed upward. Based on these observations, we conjecture that the case of a shallow plume in free water represents the case of lowest EWL values.

SUMMARY AND CONCLUSIONS

This disclosure presents a numerical investigation of the amount of water ejected from shallow depth explosion plumes for the potential use as a barrier from incoming projectiles. The computational code BUB2D was used for the simulations based on the generalized hydrodynamics model which has been verified and validated on a wide variety of applications, including shallow plume simulations (see, e.g. [Refs. 7, 8, 10, 11, 18]). The parameters used for the code in this report were selected such that the transition from a non-venting to venting bubble occurred at the approximate scaled depth value $C = D/A_{max} \approx 0.25$, consistent with values reported in [Ref. 18]. Using these same parameters and the same initial conditions as the shallow plume simulations, a grid convergence study was performed on the spherically symmetric bubble, demonstrating the errors were under 1% for the bubble maximum radius, and less than 4% for the first period.

The simulations for the original run matrix (charge weights between 1 and 2 pounds, and charge depts. Between 3 and 5 feet) revealed just over a peak equivalent length of between 1 and 3 feet of water through the plume center is ejected when measured at a height of 8 feet above the surface. These barriers increased to between 2 and 5 feet when measured at a height of 6 feet, and between 3 and 6 feet at a height of 4 feet above the surface. The peak plume velocities were on the order of 100 ft/s, but these decayed after the time of the first bubble maximum volume at approximately t=0.1 seconds.

Finally the effects of shallow depths, and constrained regions were shown to slightly enhance the EWL levels. In the first case this demonstrates that if an effective barrier is formed in deep water, it will remain effective in shallow water, provided the depth is not so shallow that the bubble vents. The case of the restricted "pool" shows some consideration must be given if any validations are performed in a confined experimental region.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

What is claimed is:

1. An active defense system comprising:
   a launcher configured to launch an explosive countermeasure into water;
   an active infrared (IR) detection device configured to detect a target projectile and cue a radar;
   the radar configured to track the target projectile; and
   a targeting system configured to enable the launcher, based at least in part on detection of the target projectile, an interception position, and an engagement window timing, wherein the explosive countermeasure is configured to detonate at a target distance and form a water barrier.

2. The active defense system of claim 1, wherein the active IR detection device and radar are configured to determine a trajectory of the target projectile and launch the explosive countermeasure based at least in part on the trajectory of the target projectile intercepting a maritime vessel.

3. The active defense system of claim 1, wherein the explosive countermeasure travels approximately 5 meters from a side of a maritime vessel and 1 meter beneath the waterline.

4. The active defense system of claim 1, wherein an upward velocity of the water barrier is 100 to 160 feet/second.

5. The active defense system of claim 1, further comprising: launching multiple explosive countermeasures.

6. The active defense system of claim 1, wherein the radar is a passive radar, and the active IR detection device and the radar enable detection/tracking of the target projectile at 200 meters or more.

7. An active defense method, the method comprising:
   detecting, by an active infrared (IR) detection device, a target projectile;
   cueing, by the active IR detection device, a radar by providing range, bearing, elevation, and speed of the target projectile;
   tracking, by the radar, the target projectile, wherein the tracking is based at least in part on the cueing;
   enabling, by a targeting system, to launch an explosive countermeasure based at least in part on an interception position and an engagement window timing, and detonating the explosive countermeasure at a target distance, wherein the detonation forms a water barrier.

8. The active defense of claim 7, wherein the active IR detection device and radar are configured to detect and determine a trajectory of the target projectile and launch the explosive countermeasure based at least in part on the trajectory of the target projectile intercepting the maritime vessel.

9. The active defense of claim 7, wherein the explosive countermeasure travels approximately 5 meters from a side of a maritime vessel and 1 meter beneath the waterline.

10. The active defense of claim 7, wherein an upward velocity of the water barrier is 100 to 160 feet/second.

11. The active defense of claim 7, further comprising: launching multiple explosive countermeasures.

12. The active defense of claim 7, wherein the radar is a passive radar, and the active IR detection device and the radar enable detection of the target projectile at 200 meters or more.

* * * * *